United States Patent
Mashimo et al.

(10) Patent No.: US 8,989,019 B2
(45) Date of Patent: Mar. 24, 2015

(54) TRANSMISSION SYSTEM, MANAGING COMPUTER, AND LOGICAL PATH CONSTRUCTION METHOD

(71) Applicant: Hitachi, Ltd., Tokyo (JP)

(72) Inventors: Daisuke Mashimo, Tachikawa (JP); Kiyotaka Takahashi, Okegawa (JP); Masahiro Kimura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 25 days.

(21) Appl. No.: 13/748,275

(22) Filed: Jan. 23, 2013

(65) Prior Publication Data
US 2013/0208599 A1 Aug. 15, 2013

(30) Foreign Application Priority Data
Feb. 14, 2012 (JP) ................................. 2012-029758

(51) Int. Cl.
*H04L 12/54* (2013.01)
*H04L 12/733* (2013.01)
*H04L 12/729* (2013.01)
*H04L 12/717* (2013.01)

(52) U.S. Cl.
CPC ............ *H04L 45/122* (2013.01); *H04L 45/125* (2013.01); *H04L 45/42* (2013.01)
USPC ....................................................... 370/238

(58) Field of Classification Search
CPC ....... H04L 45/122; H04L 45/42; H04L 45/44; H04L 45/50; H04L 47/10; H04L 45/125
USPC .......... 370/237, 238, 404, 424; 709/235, 239, 709/243, 244
See application file for complete search history.

(56) References Cited

U.S. PATENT DOCUMENTS

| 7,355,979 | B2 * | 4/2008 | Nishioka et al. ............... 370/238 |
| 7,630,317 | B2 * | 12/2009 | Okamura et al. ............. 370/237 |
| 2002/0131424 | A1 * | 9/2002 | Suemura ........................ 370/400 |
| 2003/0043821 | A1 * | 3/2003 | Van Den Bosch et al. ... 370/400 |
| 2005/0169313 | A1 | 8/2005 | Okamura et al. |
| 2006/0056328 | A1 * | 3/2006 | Lehane et al. ................. 370/315 |
| 2007/0147256 | A1 * | 6/2007 | Pichot ............................ 370/238 |
| 2008/0049621 | A1 * | 2/2008 | McGuire et al. ............ 370/236.2 |
| 2013/0121338 | A1 * | 5/2013 | Kusama et al. ................ 370/400 |

FOREIGN PATENT DOCUMENTS

JP 11-136256 5/1999
JP 2005-217838 A 8/2005

* cited by examiner

*Primary Examiner* — Min Jung
(74) *Attorney, Agent, or Firm* — Foley & Lardner LLP

(57) ABSTRACT

A transmission system that uses resources of a transmission network efficiently to a request of dynamic bandwidth guarantee from a communication network while controlling a load of a managing server, and connects a logical path of the communication network and a logical path of a transmission network. In the transmission system that has multiple transmission nodes each serving as a component of the transmission network, multiple communication nodes each serving as a component of the communication network, and a managing computer, when an available bandwidth of a default path is smaller than a guaranteed bandwidth contained in control information and then when information about the logical path already having been dynamically constructed coincides with a condition, a logical path that uses a route different from a specified default path is dynamically constructed as a logical path in the transmission network.

14 Claims, 11 Drawing Sheets

| TRANSMISSION NETWORK PATH ID (TP-ID) 501 | IP/MPLS NETWORK PATH ID (IP-ID) 502 | DESTINATION NETWORK ADDRESS 503 |
|---|---|---|
| 1000 | 10 | A-2 |
| 2000 | 20 | B-2 |

FIG. 5

| TRANSMISSION NETWORK PATH ID (TP-ID) ~141 | INPUT NODE ID ~142 | OUTPUT NODE ID ~143 | AVAILABLE BANDWIDTH ~144 | DESTINATION NETWORK ADDRESS ~145 | SESSION ID (S-ID) ~146 | IP/MPLS NETWORK PATH ID (IP-ID) ~147 | USER CLASS (Class) ~148 | REQUIRED BANDWIDTH (BW) ~149 | USE LINK ~155 |
|---|---|---|---|---|---|---|---|---|---|
| 1000 | TP1 | TP2 | 500M | A | a | 100 | 1 | 100M | 1→2 |
|  |  |  |  |  | b | 200 | 2 | 200M |  |
| 2000 | TP3 | TP4 | 500M | B | c | 300 | 3 | 300M | 3→4 |

| TRANSMISSION SOURCE NODE ID ~151 | TRANSMISSION DESTINATION NODE ID ~152 | AVAILABLE BANDWIDTH ~153 | DELAY BETWEEN NODES ~154 |
|---|---|---|---|
| 1 | 2 | 400M | d1 |
| 1 | 3 | 600M | d2 |
| 3 | 4 | 100M | d3 |

| USER CLASS ~161 | ALLOWABLE DELAY ~162 |
|---|---|
| 1 | D1 |
| 2 | D2 |
| 3 | D3 |

| TRANSMISSION NETWORK PATH ID (TP-ID) 141 | INPUT NODE ID 142 | OUTPUT NODE ID 143 | AVAILABLE BANDWIDTH 144 | DESTINATION NETWORK ADDRESS 145 | SESSION ID (S-ID) 146 | IP/MPLS NETWORK PATH ID (IP-ID) 147 | USER CLASS (Class) 148 | REQUIRED BANDWIDTH (BW) 149 | USE LINK 155 |
|---|---|---|---|---|---|---|---|---|---|
| 1000 | TP1 | TP2 | 500M | a | | | | | 1→2 |

(B) 140

| TRANSMISSION NETWORK PATH ID (TP-ID) 141 | INPUT NODE ID 142 | OUTPUT NODE ID 143 | AVAILABLE BANDWIDTH 144 | DESTINATION NETWORK ADDRESS 145 | SESSION ID (S-ID) 146 | IP/MPLS NETWORK PATH ID (IP-ID) 147 | USER CLASS (Class) 148 | REQUIRED BANDWIDTH (BW) 149 | USE LINK 155 |
|---|---|---|---|---|---|---|---|---|---|
| 1000 | TP1 | TP2 | 400M | a | A | 10 | 2 | 100M | 1→2 |

(C) 140

| TRANSMISSION NETWORK PATH ID (TP-ID) 141 | INPUT NODE ID 142 | OUTPUT NODE ID 143 | AVAILABLE BANDWIDTH 144 | DESTINATION NETWORK ADDRESS 145 | SESSION ID (S-ID) 146 | IP/MPLS NETWORK PATH ID (IP-ID) 147 | USER CLASS (Class) 148 | REQUIRED BANDWIDTH (BW) 149 | USE LINK 155 |
|---|---|---|---|---|---|---|---|---|---|
| 1000 | TP1 | TP2 | 400M | a | A | 10 | 2 | 100M | 1→2 |
| 2000 | TP1 | TP2 | 0 | a | B | | 4 | 500M | |

(D) 140

| TRANSMISSION NETWORK PATH ID (TP-ID) 141 | INPUT NODE ID 142 | OUTPUT NODE ID 143 | AVAILABLE BANDWIDTH 144 | DESTINATION NETWORK ADDRESS 145 | SESSION ID (S-ID) 146 | IP/MPLS NETWORK PATH ID (IP-ID) 147 | USER CLASS (Class) 148 | REQUIRED BANDWIDTH (BW) 149 | USE LINK 155 |
|---|---|---|---|---|---|---|---|---|---|
| 1000 | TP1 | TP2 | 400M | a | A | 10 | 2 | 100M | 1→2 |
| 2000 | TP1 | TP2 | 0 | a | B | 20 | 4 | 500M | 1→3→4→2 |

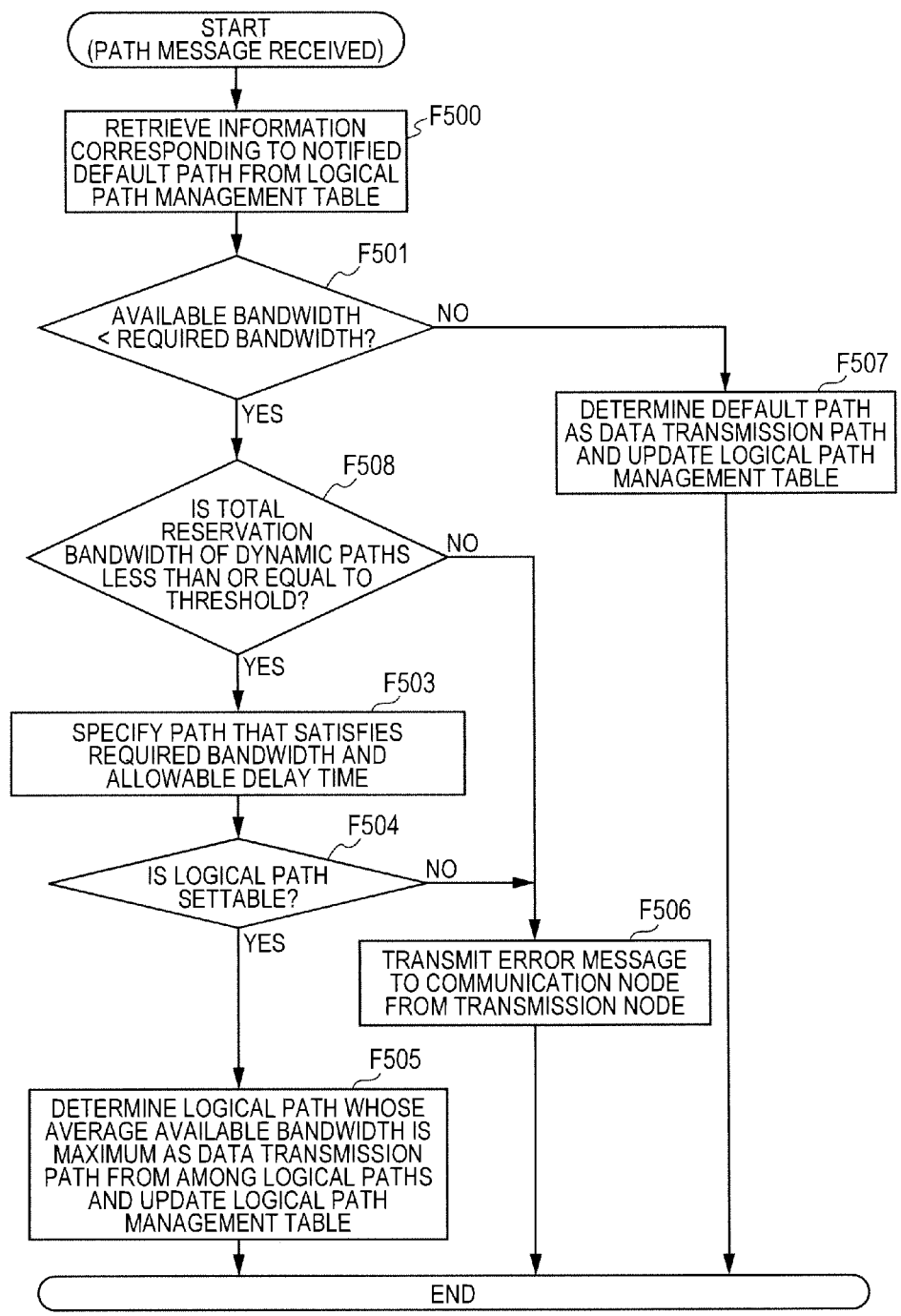

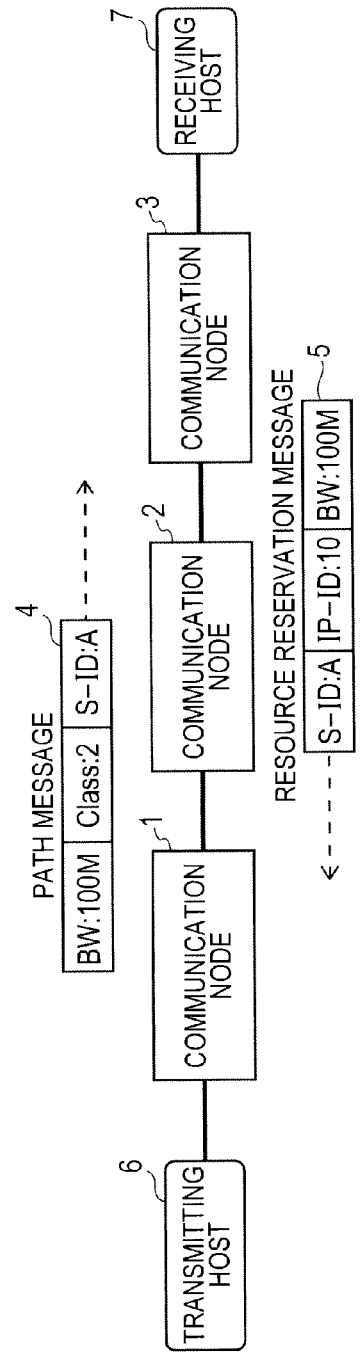

TRANSMISSION SYSTEM, MANAGING COMPUTER, AND LOGICAL PATH CONSTRUCTION METHOD

CLAIM OF PRIORITY

The present application claims priority from Japanese patent application JP 2012-029758 filed on Feb. 14, 2012, the content of which is hereby incorporated by reference into this application.

FIELD OF THE INVENTION

The present invention relates to a communication system that has multiple transmission nodes each serving as a component of a transmission network, multiple communication nodes each serving as a components of a communication network, and a managing computer for managing the transmission network, and more specifically to a transmission system whose managing computer forms a logical path in the transmission network.

BACKGROUND OF THE INVENTION

In recent years, a demand for a bandwidth guaranteed service that guarantees a user's communication quality is increasing. When the bandwidth guaranteed service is a service that when a user requests communication whose bandwidth is guaranteed to a network, the network side secures a required bandwidth of the user, and the network that guarantees the user's required bandwidth is provided to the user.

As a trunk-line data service network for providing the bandwidth guaranteed service, conventionally, the IP/MPLS (Internet Protocol/Multi-Protocol Label Switching) network has spread widely. In the IP/MPLS network, a packet is transferred not by the related art IP routing but by label switching, and an end-to-end logical communication path (logical path) whose bandwidth is guaranteed for every session by a decentralized control between communication nodes that form the network.

On the other hand, communication enterprises that provide the bandwidth guaranteed service with the transmission networks using a centralized-control-type communications protocol are increasing in number. The centralized-control-type communications protocols are communications protocols, such as MPLS-TP (Multiprotocol Label Switching-Transport Profile), for example.

The transmission network can provide the logical path excellent in confidentiality as compared with a related art IP/MPLS network, and features that an OAM (Operation Administration and Maintenance) function of monitoring failures in the communication route and a QoS (Quality of Service) function of guaranteeing a quality of service are strengthened. In order to attain higher advancement of the present IP service using features of these transmission networks, there is started an examination of a scheme in which the related art IP/MPLS network (communication network) is connected to a user side and an IP inter-work technology of connecting the transmission network to the core side is achieved by standardization of IETF (Internet Engineering Task Force) etc. Incidentally, a reason why the related art IP/MPLS network is used for the user side is to aim at reduction of the cost.

In order to realize an IP inter-work described above, it is necessary to select a centralized control that is a network control method adopted in the transmission network or the decentralized control that is a network control method adopted in the IP/MPLS network, and to connect the transmission network and the IP/MPLS network.

Here, the both network control methods will be compared. The centralized control is a method whereby a managing server controls the network. For this reason, although a load tends to concentrate on the managing server in the centralized control and flexibility of a network design is inferior to the decentralized control, since the managing server can grasp the whole state of the network, ease of management, such as cut-off of the communication route in which a failure occurs and setting of an optimal route, is superior to the decentralized control. On the other hand, since in the decentralized control, each communication node that forms the IP/MPLS network controls the network autonomously, the decentralized control is superior to the centralized control in the flexibility and expandability of the network design, but it is difficult to optimize route setting and clarify a position of the failure and an influence of the failure because each communication node cannot grasp the whole state of the network.

From the viewpoint of advancement of an IP service, it is desirable that the IP inter-work is realized by the centralized control.

Moreover, a method for constructing the logical path of the transmission network and the IP/MPLS network will be explained. Generally, the logical path of the transmission network is constructed by an administrator statically setting up a route and a guaranteed bandwidth of the logical path. On the other hand, a logical path of the IP/MPLS network is constructed by each communication node that forms the IP/MPLS network dynamically setting up a route based on network parameters (link cost, the number of hops, etc.). Moreover, when the bandwidth guaranteed service is provided in the IP/MPLS network, each communication node constructs the logical path using a dynamic bandwidth reservation protocol, such as RSVP-TE (Resource Reservation Protocol-Traffic Engineering).

FIG. 15 is an explanatory drawing of an outline of a bandwidth prediction processing of the IP/MPLS network using the RSVP-TE.

First, when a transmitting host 6 requires provisioning of the bandwidth guaranteed service to a communication node 1 that is connected to itself, the communication node 1 transmits a path message 4 to a communication node 3 to which a receiving host 7 is connected along a communication route being dynamically determined. The path message 4 contains a session ID (S-ID), a user class (Class) that is a value showing a user's priority, and the required bandwidth (BW).

When an available bandwidth of a link connected with the communication node of a next hop can present the required bandwidth contained in the path message 4, each of the communication nodes 1 and 2 transmits the path message 4 to the communication node of the next hop.

When receiving the path message 4, the communication node 3 to which the receiving host 7 is connected transmits a resource reservation message 5 to the communication node 1. The resource reservation message 5 contains the session ID (S-ID), the ID (IP-ID) of the logical path that is constructed, and the required bandwidth (BW).

This enables each of the communication nodes 1 to 3 to construct the logical path of End-to-End, while setting up reservation of the required bandwidth. As described above, in order to realize the IP inter-work, a technology of providing the bandwidth guaranteed service by connecting the logical path of the transmission network constructed by the centralized control to the logical path of the IP/MPLS network dynamically constructed by the decentralized control is required.

As a related method for providing the bandwidth guaranteed service, there is known a method for securing the user's required bandwidth by dynamically constructing the logical path by the centralized control in the IP/MPLS network (e.g., refer to Japanese Unexamined Patent Application Publication No. 2005-217838). Specifically, the managing server constructs all the logical paths in the IP/MPLS network by the centralized control and distributes traffic in the IP/MPLS network by changing the logical path based on a usage status of resources.

Moreover, a method for providing the bandwidth guaranteed service in an ATM (Asynchronous Transfer Mode) network is known (e.g., refer to Japanese Unexamined Patent Application Publication No. Hei11(1999)-136256). Specifically, in an ATM network where a PVC (Permanent Virtual Connections) system in which the administrator statically constructs the logical path and an SVC (Switched Virtual Connections) system in which the logical path is dynamically constructed between the nodes are intermingled, in order to restrict a bandwidth that an SVC session uses, a threshold is set to a total value of the bandwidths of the logical paths constructed in the SVC system. This makes the total value of the bandwidths used by the SVC sessions become less than or equal to the threshold, which enables the bandwidth of the SVC session using static logical paths to be secured. Moreover, when the available bandwidth for newly connecting a PVC session runs short, establishment of the PVC session is prioritized by changing a threshold of the SVC session to a lower value, and making a new session may not be received until a guaranteed bandwidth of the SVC session becomes lower than the threshold after the change.

SUMMARY OF THE INVENTION

In Japanese Unexamined Patent Application Publication No. 2005-217838, since a managing server dynamically sets up all logical paths used in the IP/MPLS network and changes the logical path frequently based on a usage status of resources, a load of the managing server becomes very high. Even in the case where the managing server disclosed in Japanese Unexamined Patent Application Publication No. 2005-217838 is applied to an IP inter-work, the same problem occurs.

Moreover, although in Japanese Unexamined Patent Application Publication No. Hei11(1999)-136256, traffic in a network can be distributed by intermingling a statically constructed path and a dynamically constructed path, since dynamic construction of the path is restricted because of the session using the static path, even when there is no user of the session that uses the static path, more than a fixed number of dynamic paths cannot be constructed and resources cannot be used effectively.

Then, an object of the present invention is to provide a transmission system that uses resources of a transmission network efficiently to a request of dynamic bandwidth guarantee from a communication network and connects the logical path of the communication network and the logical path of the transmission network while controlling the load of the managing server.

Showing one representative example of the present invention, it is a transmission system that has multiple transmission nodes each serving as a component of the transmission network, multiple communication nodes each serving as a component of the communication network, and a managing computer of when a first communication node among the multiple communication nodes connected with one another through the transmission network establishes a session with a second communication node thereamong and transmits data, constructing a first logical path showing a communication route running from the transmission node serving as a start point to a transmission node serving as a terminal point in the transmission network, (a) in which the managing computer constructs a default path that uses a shortest route between two arbitrary transmission nodes connected to the communication node in advance, stores the default path identification information and a destination of information passing through the default path, and when a condition about a dynamically constructed first logical path is set up in the managing computer in advance and the first communication node establishes a session with the second communication node and starts data transmission, transmits control information containing the destination of the data and a guaranteed bandwidth of the session to the transmission node that is connected to itself, (b) in which when receiving the control information, the transmission node transmits the received control information to the managing computer, and (c) in which when receiving the control information, the managing computer specifies the default path corresponding to the destination contained in the control information, when an available bandwidth of the specified default path is more than or equal to the guaranteed bandwidth contained in the control information, it sets up a transmission node that forms the specified default path so that the specified default path may be mapped to a second logical path being set up so as to become a communication route running from the first communication node to the second communication node in the communication network, and when the available bandwidth of the specified default path is smaller than the guaranteed bandwidth contained in the control information and then when information about an already constructed first logical path coincides with the condition, it dynamically constructs a logical path that uses a route different from the specified default path as the first logical path and sets up the transmission node that forms the dynamically constructed first logical path so that the dynamically constructed first logical path may be mapped to the second logical path.

Briefly explaining effects acquired by representative aspects of the invention disclosed by this application, these are as follows. That is, it is possible to provide a transmission system that uses resources of the communication network efficiently and connects the logical path of the communication network and the logical path of the transmission network to a request of dynamic bandwidth guarantee from the communication network while controlling the load of the managing server.

BRIEF DESCRIPTION OF THE DRAWINGS

FIG. 5 is an explanatory drawing of a logical path management table of the first embodiment of the present invention;

FIG. 6 is an explanatory drawing of a link management table of the first embodiment of the present invention;

FIG. 7 is an explanatory drawing of a user class management table of the first embodiment of the present invention;

FIG. 10 is an explanatory drawing of transition of information registered in a logical path management table 140 in the transmission network path construction processing of the first embodiment of the present invention;

FIG. 13 is a flowchart of a transmission network path determination processing of a third embodiment of the present invention;

FIG. 14 is an explanatory drawing of the logical path management table 140 after initialization by a managing server of a fourth embodiment of the present invention; and FIG. 15 is an explanatory drawing of an outline of a bandwidth prediction processing of an IP/MPLS network using RSVP-TE.

DETAILED DESCRIPTION OF THE PREFERRED EMBODIMENTS

First Embodiment

A first embodiment of the present invention will be explained using FIGS. 1 to 10.

Figure 1:
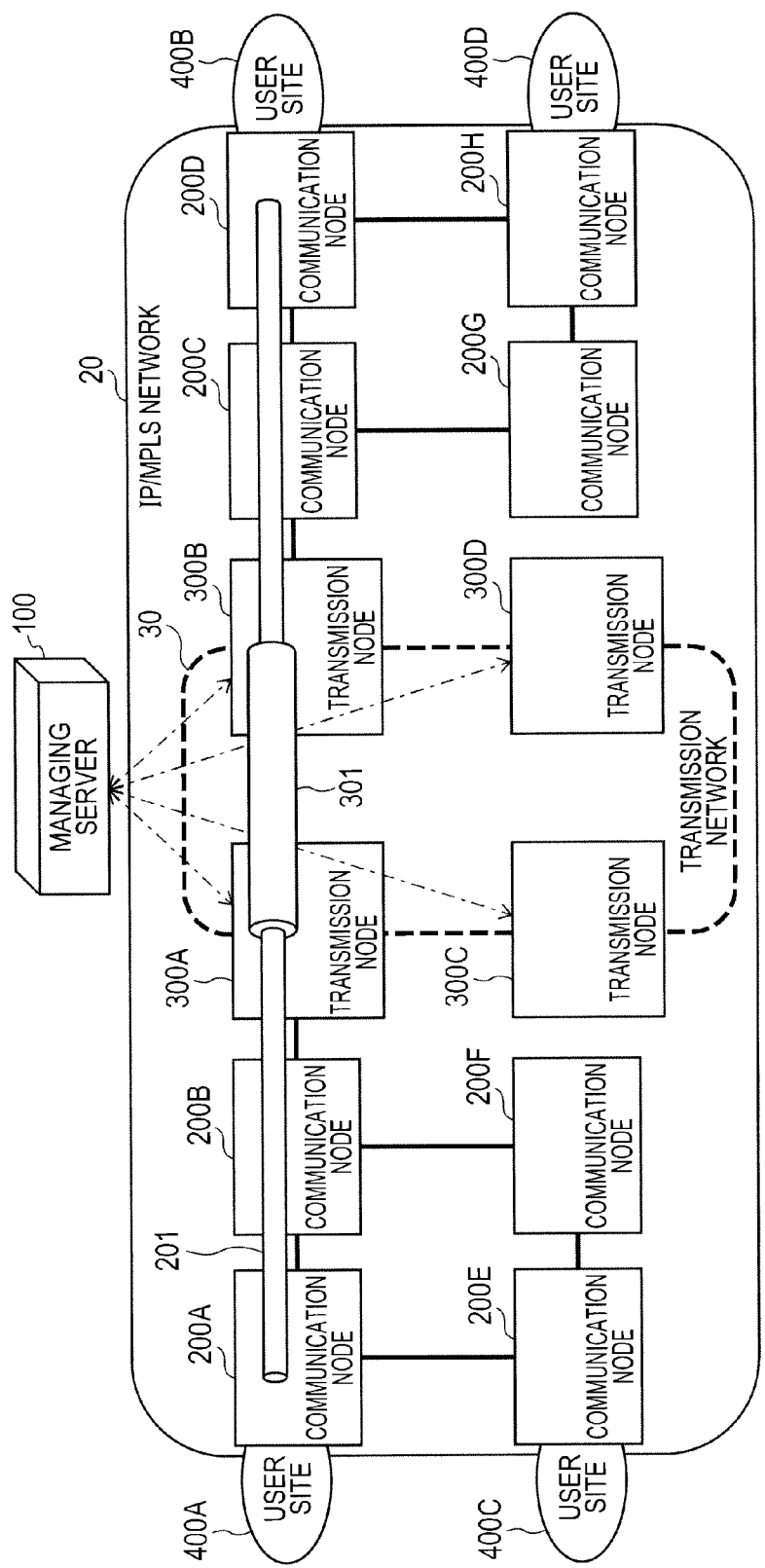
FIG. 1 is an explanatory drawing of a configuration of a transmission system of a first embodiment of the present invention.

FIG. 1 is an explanatory drawing of a configuration of a transmission system of the first embodiment of the present invention.

The communication system has multiple communication nodes 200A to 200H (hereinafter, generally called a communication node 200) serving as components of an IP/MPLS network 20 that connects user sites 400A to 400D (hereinafter, generally called a user site 400), multiple transmission nodes 300A to 300D (hereinafter, generally called a transmission node 300) serving as components of a transmission network 30, and a managing server 100 for managing the transmission node 300. The transmission network 30 functions as a core of the IP/MPLS network 20. The managing server 100 is connected with the transmission node 300 through an unillustrated management network.

Moreover, when transmitting and receiving data between the user sites 400, each communication node 200 maps between a logical path of the IP/MPLS network 20 dynamically constructed according to a destination of the data and a logical path of the transmission network 30. For example, when the user site 400A and the user site 400B communicate data with each other, a logical path 201 of the IP/MPLS network 20 and a logical path 301 of the transmission network 30 are connected.

Although in this embodiment, the case where a communications protocol used in the transmission network 30 is MPLS-TP will be explained as one example, the present invention does not depend on the communications protocol used in the transmission network 30, and produces the same effect with an other protocol. Moreover, although in this embodiment, the case where a bandwidth reservation protocol of the IP/MPLS network 20 is RSVP-TE will be explained, the present invention will produce the same effect if it is a bandwidth reservation protocol that reserves a bandwidth simultaneously with construction of the logical path (e.g., CR-LDP (Constraint-based Label Distribution Protocol) etc.).

Incidentally, it goes without saying that the number of the communication nodes 200, the number of the transmission nodes 300, and the number of the user sites 400 are not limited to FIG. 1.

Figure 2:
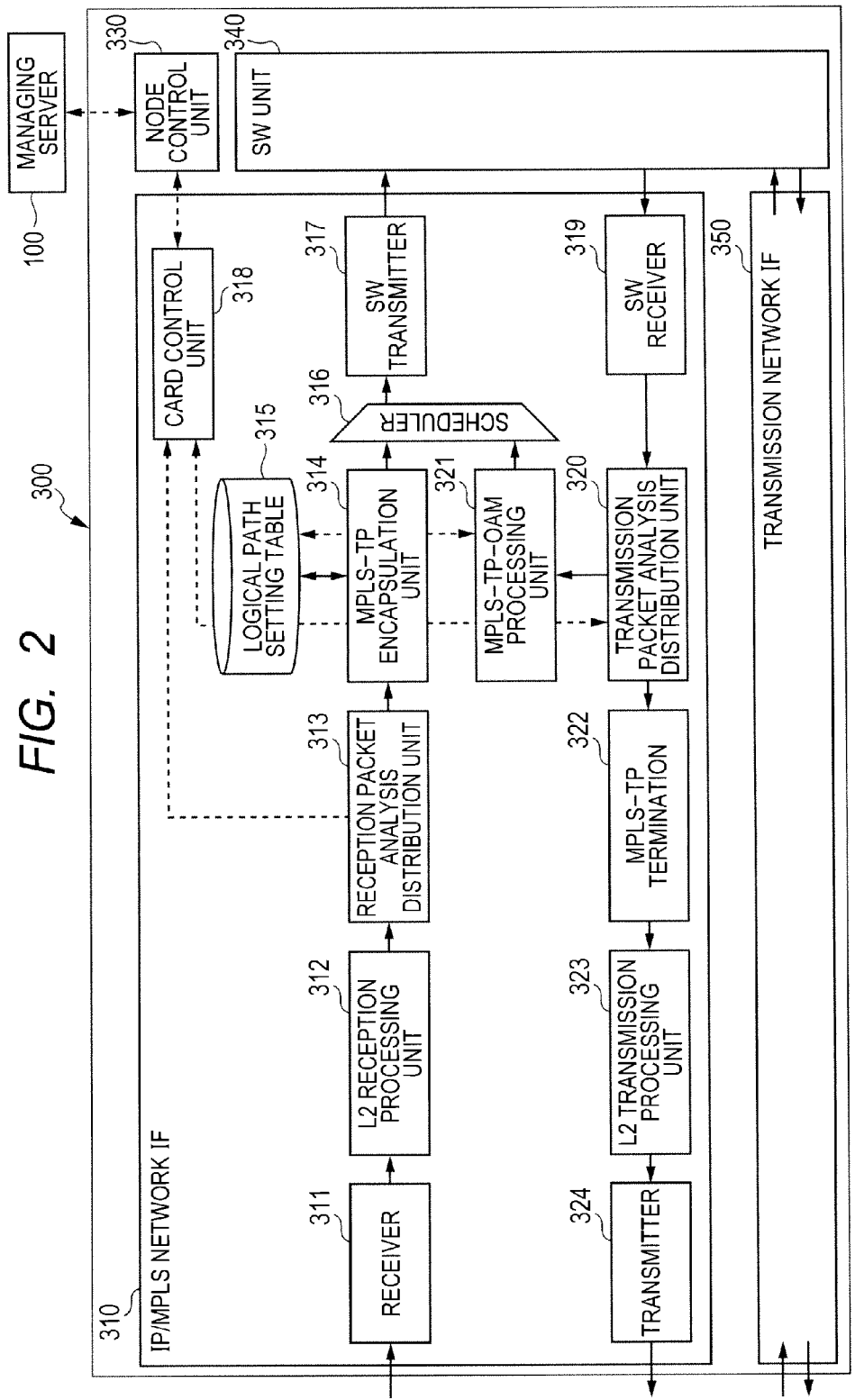
FIG. 2 is an explanatory drawing of a configuration of a transmission node of the first embodiment of the present invention.

FIG. 2 is an explanatory drawing of a configuration of the transmission node 300 of the first embodiment of the present invention.

The transmission node 300 has one or more IP/MPLS network IFs (interfaces) 310, one or more node control units 330, a switch (SW) unit 340, and one or more transmission network IFs (interfaces) 350.

A solid line arrow shown in FIG. 2 shows a flow of a main signal, and a dashed line arrow shows a flow of a control signal.

The node control unit 330 is connected to the managing server 100 through the management network, and sets up setting information received from the managing server 100 in the SW unit 340, the IP/MPLS network IF 310, and the transmission network IF 350. Moreover, the node control unit 330 transfers control information of the bandwidth reservation protocol in the IP/MPLS network 20 (a path message and a resource reservation message) to the managing server 100.

The SW unit 340 analyzes a packet received from the IP/MPLS network IF 310 or the transmission network IF 350, specifies a transfer destination of the received packet, and transmits the received packet to a suitable IP/MPLS network IF 310 or transmission network IF 350 based on the specified transfer destination.

The transmission network IF 350 is an interface that is connected to an other transmission node 300 that forms the transmission network 30, and is configured to have an illustrated transmitter/receiver to/from the SW unit 340 and the transmission network 30, a card control unit for communicating with the node control unit 330, etc.

The IP/MPLS network IF 310 has a card control unit 318, a receiver 311, an L2 reception processing unit 312, a reception packet analysis distribution unit 313, an MPLS-TP encapsulation unit 314, a logical path setting table 315, a scheduler 316, a SW transmitter 317, a SW receiver 319, a transmission packet analysis distribution unit 320, an MPLS-TPOAM processing unit 321, an MPLS-TP termination 322, an L2 transmission processing unit 323, and a transmitter 324.

The card control unit 318 is connected to the node control unit 330, and has a function of setting up each constituent unit based on the setting information inputted from the node control unit 330 and a function of reading information that is set up in the each constituent unit and outputting the read information to the node control unit 330.

The receiver 311 receives data from the connected communication node 200.

The L2 reception processing unit 312 terminates a protocol of a data link layer of an OSI (Open Systems Interconnection) reference model that connects between the communication node 200 and the transmission node 300. When the data link layer protocol is Ethernet (a registered trademark and hereinafter the same), for example, the L2 reception processing unit 312 performs a termination processing of an Ethernet frame. Moreover, L2 reception processing unit 312 learns a transmission source MAC address of the received Ethernet frame, and shares the learned MAC address with the L2 transmission processing unit 323.

The reception packet analysis distribution unit 313 analyzes a packet inputted from the L2 reception processing unit 312, and when the inputted packet is a data packet as a result of analysis, outputs the inputted packet to the MPLS-TP encapsulation unit 314. On the other hand, when the inputted and received data is a control packet of the bandwidth reservation protocol used in the IP/MPLS as a result of analysis, the reception packet analysis distribution unit 313 snoops the inputted bandwidth reservation control packet and outputs information of the bandwidth reservation to a card control unit 49, and also outputs the bandwidth reservation message to the MPLS-TP encapsulation unit 314.

The logical path setting table 315 is a table that maps a logical path ID of the IP/MPLS network 20 (an IP/MPLS network path ID) and a logical path ID of the transmission network 30 (a transmission network path ID). Details of the logical path setting table 315 will be explained using FIG. 4.

When transmitting a packet to the transmission network 30, the MPLS-TP encapsulation unit 314 encapsulates the packet that is to be transmitted in a format of MPLS-TP.

Specifically, when the data packet contains the IP/MPLS network path ID, the MPLS-TP encapsulation unit 314 refers to the logical path setting table 315, acquires the transmission network path ID that is mapped with the IP/MPLS network path ID of the data packet, determines the logical path identified by the acquired transmission network path ID as a logical path in which the data packet should be transferred, encapsulate the data packet, and transmits the encapsulated data packet to the scheduler 316.

On the other hand, when the data packet is the bandwidth reservation control packet etc. and the data packet does not contain the IP/MPLS network path ID, the MPLS-TP encapsulation unit 314 refers to the logical path setting table 315, acquires the transmission network path ID corresponding to the destination network contained in the data packet, determines the logical path identified by the acquired transmission network path ID as a logical path in which the data packet should be transferred, encapsulates the data packet, and transfers the encapsulated data packet to the scheduler 316.

The scheduler 316 arbitrates an output of the MPLS packet by the MPLS-TP encapsulation unit 314 and the MPLS-TPOAM processing unit 321. Moreover, the scheduler 316 outputs the received MPLS packet to a SW transmitter 317.

The SW transmitter 317 outputs the MPLS packet inputted from the scheduler 316 to the SW unit 340.

The MPLS-TPOAM processing unit 321 performs an OAM processing of the MPLS-TP. Especially the MPLS-TPOAM processing unit 321 has a function (DM: Delay Measurement) of measuring an average packet delay between adjacent transmission nodes 300, and notifies periodically a state of the transmission node 300, such as the average packet delay, to the managing server 100.

The SW receiver 319 outputs the packet inputted from the SW unit 340 to the transmission packet analysis distribution unit 320.

The transmission packet analysis distribution unit 320 analyzes the MPLS packet inputted from the SW receiver 319, and classifies the inputted MPLS packet into any one of the data packet, an MPLS-TPOAM packet and the bandwidth reservation control packet. Then, the transmission packet analysis distribution unit 320 outputs a data packet and the bandwidth reservation control packet to the MPLS-TP termination 322, and outputs the MPLS-TPOAM packet to the MPLS-TPOAM processing unit 321.

The MPLS-TP termination 322 de-encapsulates an MPLS-TP header from the inputted MPLS packet, and outputs the de-encapsulated packet to the L2 transmission processing unit 323.

When the packet is inputted from the MPLS-TP termination 322, the L2 transmission processing unit 323 generates a MAC header based on the MAC address shared with the L2 reception processing unit 312, adds the generated header to the packet, and outputs it to a transmitter 324.

The transmitter 324 transmits a packet inputted from the L2 transmission processing unit 325 to the communication node 200.

Figures 3, 4:
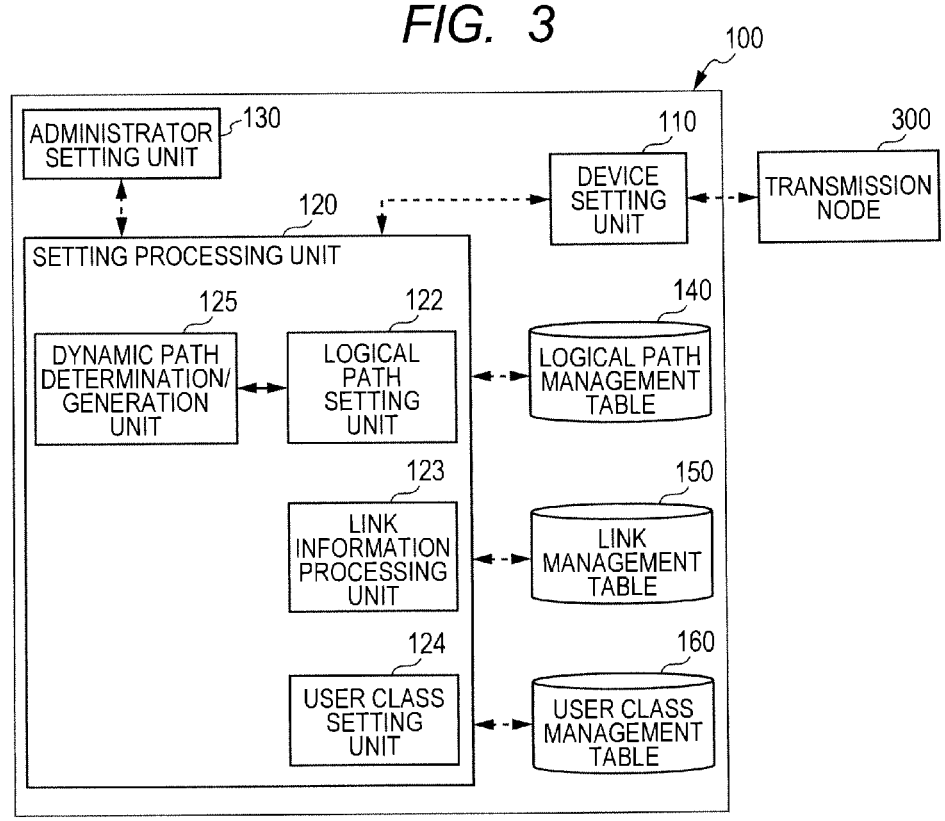
FIG. 3 is an explanatory drawing of a configuration of a managing server of the first embodiment of the present invention.
FIG. 4 is an explanatory drawing of a logical path setting table of the first embodiment of the present invention.

FIG. 3 is a diagram of a configuration of the managing server 100 of the first embodiment of the present invention.

The managing server 100 has a node setting unit 110, a setting processing unit 120, an administrator setting unit 130, and a logical path management table 140, a link management table 150, and a user class management table 160. The managing server 100 has a CPU being not illustrated, memory being not illustrated, external storage being not illustrated, etc. The system setting unit 110, the setting processing unit 120, and the administrator setting unit 130 are realized by the CPU performing respective programs corresponding to respective units stored in memory, respectively. The logical path management table 140, the link management table 150, and the user class management table 160 are stored in the memory.

The system setting unit 110 is connected with the transmission node 300 through the unillustrated management network, and has a function of transmitting the setting information inputted from the setting processing unit 120 to the transmission node 300. Moreover, the system setting unit 110 has a function of receiving the control information of the bandwidth reservation protocol in the IP/MPLS network 20 that is transmitted from the transmission node 300, state information of the transmission network 30 by an OAM function of the transmission node 300, etc.

The logical path management table 140 registers information about the logical path constructed in the transmission network 30. Details of the logical path management table 140 will be explained by FIG. 5.

The link management table 150 registers information about an available bandwidth of a link between the two adjacent transmission nodes 300 that form the transmission network 30 and a delay time by the link. Details of the link management table 150 will be explained by FIG. 6.

In the user class management table 160, a delay time allowable to a class that shows the priority of a session established when one communication node 200 transmits data to the other communication node 200 is registered. Details of the user class management table 160 will be explained by FIG. 7.

The setting processing unit 120 constructs the logical path in the transmission network 30, deletes the logical path constructed in the transmission network 30, and manages a state of the logical path constructed in the transmission network 30. The setting processing unit 120 has a logical path setting unit 122, a link information processing unit 123, a user class setting unit 124, and a dynamic path determination/generation unit 125.

The logical path setting unit 122 sets up the logical path in the transmission network 30 generated by an administrator and the logical path in the transmission network 30 that is dynamically generated by the dynamic path determination/generation unit 12 in the transmission node 300 that will serves as a route of these logical paths through the node setting unit 110. Moreover, the logical path setting unit 122 updates the logical path management table 140 based on the control information on the bandwidth reservation protocol in the IP/MPLS network 20 that is transmitted from the transmission node 300.

The link information processing unit 123 manages the link management table 150. Specifically, the link information processing unit 123 registers information in the link management table 150, or updates the link management table 150.

The user class setting unit 124 manages the user class management table 160. Specifically, the user class setting unit 124 registers information in the user class management table 160 based on the administrator's operation, or updates the user class management table 160.

The dynamic path determination/generation unit 125 generates the logical path dynamically in the transmission network 30, and notifies information about the generated logical path to the logical path setting unit 122.

Part of or all of each configuration, function, processing unit, processing means that are described above may be realized by hardware, for example, by designing an integrated circuit etc. therefor. Moreover, although the case where the above-mentioned each configuration, function, etc. are realized by software interpreting and performing a program for realizing each function was explained, it goes without saying that information of the program, the table, the file, etc. that realize respective functions can be stored not only in memory but also in recording nodes, such as a hard disk drive and an SSD (Solid State Drive), or in recording media, such as an IC card, an SD card, and a DVD, and such information can be downloaded and installed through a network etc. as needed.

FIG. 4 is an explanatory drawing of the logical path setting table 315 of the first embodiment of the present invention.

The logical path setting table 315 contains a transmission network path ID (TP-ID) 501, an IP/MPLS network path ID (IP-ID) 502, and a destination network address 503.

Logical path identification information in the transmission network 30 is registered in the transmission network path ID 501. Logical path identification information in the IP/MPLS network 20 is registered in the IP/MPLS network path ID 502. Address information of a transmission destination of a packet passing through the logical path in the transmission network 30 that is identified by the logical path identification information registered in the transmission network path ID 501 is registered in the destination network address 503.

The logical path setting table 315 is a table that maps the logical path constructed in the transmission network 30, the logical path in the IP/MPLS network 20, and the address information of the packet passing through these logical paths with one another.

FIG. 5 is an explanatory drawing of the logical path management table 140 of the first embodiment of the present invention.

The logical path management table 140 contains a transmission network path ID (TP-ID) 141, an input node ID 142, an output node ID 143, an available bandwidth 144, a destination network address 145, a session ID (S-ID) 146, an IP/MPLS network path ID (IP-ID) 147, a user class (Class) 148, a required bandwidth (BW) 149, and a use link 155.

The logical path identification information in the transmission network 30 is registered in the transmission network path ID (TP-ID) 141. Identification information of the transmission node 300 serving as a starting point of the logical path in the transmission network 30 is registered in the input node ID 142. The identification information of the transmission node 300 serving as a terminal point of the logical path in the transmission network 30 is registered in an output node ID 143. A bandwidth providable by the logical paths in the transmission network 30 from which an already reserved bandwidth is excluded is registered in the available bandwidth 144. Address information of the transmission destination of the packet passing through the logical path in the transmission network 30 is registered in the destination network address 145.

Identification information of the session assigned to the logical path in the transmission network 30 is registered in the session ID 146. Logical path identification information in the IP/MPLS network 20 that is mapped to the logical path in the transmission network 30 is registered in the IP/MPLS network path ID 147. A class that is information indicating a priority of the session that is identified by the identification information, of the session registered in the session ID 146 is registered in the user class 148. A value indicating the required bandwidth of the session that is identified by the identification information of the session registered in the session ID 146 is registered in the required bandwidth 149. A link forming a route that the logical path in the transmission network 30 uses is registered in the use link 155.

FIG. 6 is an explanatory drawing of the link management table 150 of the first embodiment of the present invention.

The link management table 150 contains a transmission source node ID 151, a transmission destination node ID 152, the available bandwidth 153, and a delay between nodes 154.

In the transmission source node ID 151, the identification information of the transmission node 300 that serves as a transmission source of data among the two transmission nodes 300 that form the link is registered. In the transmission destination node ID 152, the identification information of the transmission node 300 that serves as the transmission destination of the data among the two transmission nodes 300 forming the link is registered.

In the available bandwidth 153, a value of a bandwidth that the link can provide from which an already reserved bandwidth is excluded is registered. In the delay between nodes 154, a value indicating the delay time by the link is registered.

In the transmission source node ID 151 and the transmission destination node ID 152, pieces of identification information of the two transmission nodes 300 that form the link have been registered in advance. A value indicating the bandwidth that the link can provide is registered in the available bandwidth 153 in advance, and when a predetermined bandwidth is registered in the link, the value is updated to a value obtained by subtracting the reserved bandwidth from the providable bandwidth. The delay between nodes 154 is updated based on the delay time measured by the OAM function of the transmission node 300.

FIG. 7 is an explanatory drawing of the user class management table 160 of the first embodiment of the present invention.

The user class management table 160 contains a user class 161 and an allowable delay 162.

A class that is information indicating a priority of the session is registered in the user class 161. A value showing the delay time allowable in each class is registered in the allowable delay 162. Incidentally, the higher the value registered in the allowable delay 162, the higher the priority of the class becomes.

Next, explanations of a transmission network path construction processing of constructing the logical path in the transmission network 30 and transition of the information registered in the logical path management table 140 in the transmission network path construction processing will be given using FIG. 8 to FIG. 10.

Figure 8:
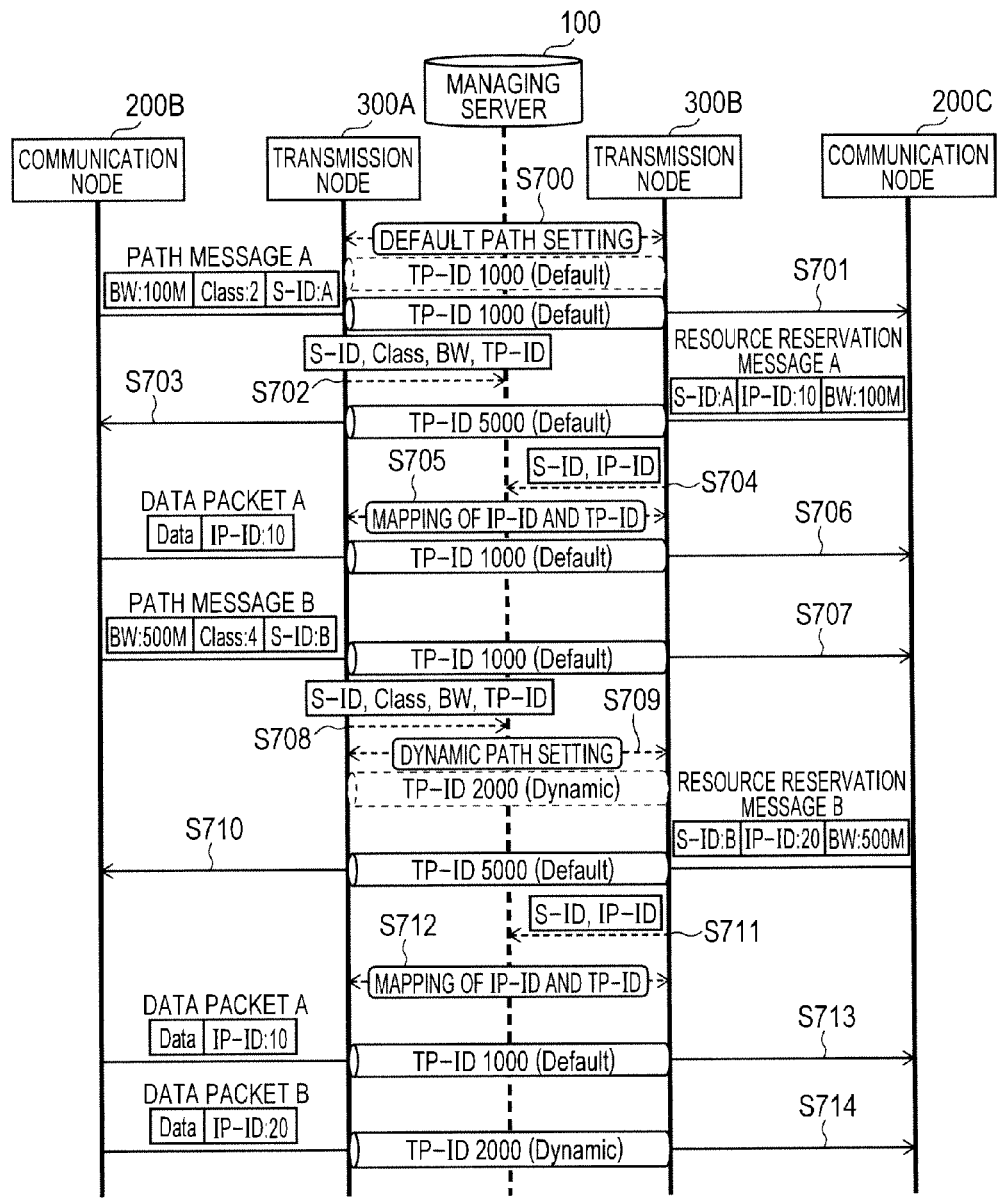
FIG. 8 is a sequence diagram of a transmission network path construction processing of the first embodiment of the present invention.

FIG. 8 is a sequence diagram of the transmission network path construction processing of the first embodiment of the present invention. FIG. 9 is a flowchart of the transmission network path determination processing by the managing server 100 of the first embodiment of the present invention. FIG. 10 is an explanatory drawing of transition of information registered in the logical path management table 140 in the transmission network path construction processing of the first embodiment of the present invention.

FIG. 8 explains the case where a session A for transmitting data to the user site 400B from the user site 400A shown in FIG. 1 is established, and subsequently a session B for transmitting data to the user site 400D from the user site 400C shown in FIG. 1.

First, initialization by the managing server 100 will be explained.

Based on an input from the administrator, the managing server 100 sets up statically one logical path that serves as a shortest route between two arbitrary transmission nodes 300 being connected with the communication node 200 (S700). This logical path being statically set up is called a default path.

Specifically, the logical path setting unit 122 gives the transmission network path ID (FIG. 8, TP-ID: 1000) to the default path based on the input of the administrator. Then, the logical path setting unit 122 transmits the transmission network path ID of the default path to the logical path setting table 315 of the transmission node 300 that forms a route of the default path and a setting command to set up the address information that becomes a destination mapped to the default path to these transmission nodes 300 through the system setting unit 110.

Moreover, the logical path setting unit 122 registers the information relevant to the default path in the logical path management table 140 (see FIG. 10A). In FIG. 10A, identification information (TP-ID: 1000) of the default path is registered in the transmission network path ID 141 of the logical path management table 140, identification information (TP1) of the transmission node 300 serving as the starting point of the default path is registered in the input node ID 142, identification information (TP2) of the transmission node 300 serving as the terminal point of the default path is registered in the output node ID 143, a value (500 MB) indicating a bandwidth that the default path can provide is registered in the available bandwidth 144, and information showing a link (1→2) forming the route that the default path uses is registered in the use link 155. Incidentally, when registering the value indicating the bandwidth that the default path can provide in the available bandwidth 144 of the logical path management table 140, the logical path setting unit 122 refers to the link management table 150, and registers in the available bandwidth 144 a minimum value of the available bandwidth of the link forming the route that the default path uses.

Incidentally, since pieces of information that will be registered in the session ID 146, the IP/MPLS network path ID 147, the user class 148, and the required bandwidth 149 are unknown at present, nothing is registered in the session ID 146, the IP/MPLS network path ID 147, the user class 148, and the required bandwidth 149.

Moreover, the user class setting unit 124 registers a class in the user class 161 of the user class management table 160 based on the input from the administrator, and also registers in the allowable delay 162 the delay time that is allowed in each class.

Furthermore, the managing server 100 sets up a condition (a dynamic setting constraint) about a transmission network path that is dynamically constructed in the dynamic path determination/generation unit 125 based on the input from the administrator. In this embodiment, the dynamic setting constraint is a condition that the number of the transmission network paths dynamically constructed within a predetermined time is less than or equal to a specified value. When the information about the transmission network path already dynamically constructed does not satisfy the dynamic setting constraint, since the managing server 100 does not dynamically construct the transmission network path, an increase in a load of the managing server 100 by a processing of dynamically constructing the transmission network path can be controlled.

Initialization of the managing server 100 is completed by the above.

The transmission node 300A receives a path message A from the communication node 200B. The path message A is control information for establishing a session, and contains required bandwidth information (BW: 100 MB) of the session, class information (Class: 2) of the session, and session identification information (S-ID: A). When the transmission node 300A receives the path message A, the reception packet analysis distribution unit 313 of the transmission node 300A snoops the path message A, acquires the required bandwidth information, the class information, and the session identification information, and outputs the path message A to the MPLS-TP encapsulation unit 314.

The MPLS-TP encapsulation unit 314 encapsulates the inputted path message A. Then, the MPLS-TP encapsulation unit 314 refers to the logical path setting table 315, specifies the transmission network path (TP-ID: 1000) corresponding to the destination network address contained in the path message A, and transmits the encapsulated path message A to the communication node 200C using the specified transmission network path (S701). Incidentally, since the IP/MPLS network path ID (IP-ID) is not given to the path message A, it will be transmitted to the communication node 200C by use of the default path.

Moreover, the reception packet analysis distribution unit 313 notifies the managing sever 100 of a path message A notification (first control information) containing the session identification information, the class information, the required bandwidth information, and identification information of the transmission network path corresponding to the destination network of the path message A (S702).

When receiving the path message notification, the managing server 100 performs the transmission network path determination processing of determining the logical path in the transmission network 30 used for data transmission. The transmission network path determination processing will be explained using FIG. 9.

First, the logical path setting unit 122 specifies the default path that coincides with the default path identification information contained in the path message notification by referring to the logical path management table 140 (F500). Specifically, the logical path setting unit 122 specifies an entry where the transmission network path identification information registered in the transmission network path ID 141 of the logical path management table 140 coincides with the default path identification information contained in the path message notification.

Next, the logical path setting unit 122 determines whether the available bandwidth of the default path specified by a processing F500 is smaller than the bandwidth (the required bandwidth) shown by the required bandwidth information contained in the path message (F501). Specifically, the logical path setting unit 122 determines whether the bandwidth registered in the available bandwidth 144 contained in the entry of the logical path management table 140 that is specified by the processing F500 is smaller than the required bandwidth contained in the path message notification.

When it is determined that the available bandwidth of the transmission network path specified by the processing F500 is more than or equal to the required bandwidth contained in the path message notification (F501: No), since the required bandwidth will be guaranteed even if the default path is assigned to the session of the path message notification, the logical path setting unit 122 determines the default path as a data transmission logical path, updates the logical path management table 140 (F507), and ends the transmission network path determination processing.

Specifically, the logical path setting unit 122 registers the session identification information contained in the path message notification in the session ID 146 contained in the entry of the logical path management table 140 specified by the processing F500, registers the class contained in the path message notification in the user class 148, and registers the required bandwidth information contained in the path message notification in the required bandwidth 149. Moreover, the logical path setting unit 122 registers in the available bandwidth 144 a value obtained by subtracting a value of the required bandwidth contained in the path message notification from the value of the bandwidth registered in the available bandwidth 144 contained in the entry of the logical path management table 140 specified by the processing F500. Furthermore, the link information processing unit 123 registers in the available bandwidth 153 a value obtained by subtracting the value of the required bandwidth contained in the path message notification from a value registered in the available bandwidth 153 of the link used by the logical path specified by the processing F500 of the link management table 150.

On the other hand, when it is determined that the available bandwidth of the transmission network path specified by the processing F500 is smaller than the required bandwidth contained in the path message notification (F501: Yes), the logical path setting unit 122 notifies the dynamic path determination/generation unit 125 of the required bandwidth information contained in the path message notification, the identification information of the transmission node 300 registered in the input node ID 1402 and the output node ID 1403 of the entry specified by the processing F500, and the class information contained in the path message notification.

The dynamic path determination/generation unit 125 determines whether the number of times that the logical path was dynamically set up during a time period from current time to current time minus a predetermined time is less than or equal to a threshold previously set as the dynamic setting constraint (F502).

When it is determined that the number of times that the logical path was dynamically set up during a time period from current time to current time minus a predetermined time is larger than the threshold in a processing F502 (F502: No), the dynamic path determination/generation unit 125 transmits a command to transmit an error message to the communication node 200 that is a transmission source of the path message to the transmission node 300 that sent the path message notification to the managing server 100 through the node setting unit 110 (F506), and ends the processing. In this case, even if receiving the resource reservation message, the managing server 100 discards the resource reservation message. Since when a load of a processing that the managing server 100 dynamically sets up the logical path is large, it does not dynamically setup the logical path, it is possible to suppress the processing load of the managing server 100.

On the other hand, when it is determined that the number of times that the logical path was dynamically set up during a time period from current time to current time minus a predetermined time is less than or equal to a threshold (F502: Yes), the dynamic path determination/generation unit 125 starts the processing of dynamically setting up the logical path.

First, the dynamic path determination/generation unit 125 refers to the link management table 150, and specifies a route that satisfies the notified required bandwidth and an allowable delay time corresponding to the notified class information from among routes running from the transmission node 300 (input transmission node) identified by the identification information of the transmission node 300 registered in the notified input node ID 1402 to the transmission node 300 (output transmission node) identified by the identification information of the transmission node 300 registered in the notified output node ID 1403 (F503).

Specifically, the dynamic path determination/generation unit 125 refers to the link management table 150, and specifies a route such that the available bandwidth of all the links that form the route are more than or equal to the required bandwidth from among routes running from the input transmission node to the output transmission node. Then, the dynamic path determination/generation unit 125 refers to the link management table 150, and specifies a route such that a total value of the delay times of the specified route is less than or equal to the allowable delay time corresponding to the notified class information.

Next, the dynamic path determination/generation unit 125 determines whether the logical path is dynamically settable by determining whether a route can be specified by a processing F503 (F504).

When it is determined in a processing F504 that the route cannot be specified by the processing F503 (F504: No), the logical path setting unit 122 determines that the logical path cannot be dynamically set up and proceeds to a processing F506, where it transmits the command to transmit an error message to the transmission node 300 that transmitted the path message notification to the managing server 100, and ends the processing.

On the other hand, when it is determined in the processing F504 that the route can be specified by the processing F503 (F504: Yes), the dynamic path determination/generation unit 125 determines that the logical path is dynamically settable, refers to the link management table 150, calculates the average delay time of the specified route, determines a route such that the calculated average delay time becomes a maximum as the data transmission logical path, updates the logical path management table 140 (F505), and ends the transmission network path determination processing.

Specifically, the dynamic path determination/generation unit 125 adds a new entry to the logical path management table 140, registers the identification information of the data transmission logical path in the transmission network path ID 141 of the added entry, registers the notified identification information of the input transmission node in the input node ID 142, registers the identification information of the notified output transmission node in the output node ID 143, registers zero in the available bandwidth 144, registers the notified class information in the user class 148, registers the notified required bandwidth information in the required bandwidth 149, and registers the link forming the route that the data transmission logical path uses in the use link 155. Moreover, the link information processing unit 123 registers in the available bandwidth 153 a value obtained by subtracting the value of the required bandwidth contained in the path message from the value registered in the available bandwidth 153 of the link that the data transmission logical path of the link management table 150 uses.

Incidentally, a reason why zero is registered in the available bandwidth 1440 is because the logical path dynamically set up is assigned only to one session and is not assigned to other sessions.

Next, the transmission network path determination processing when the managing server 100 receives the path message A will be explained.

First, in the processing F500, a transmission network path ID "1000" is specified as the default path that coincides with the identification information of the transmission network path corresponding to the destination network of the path message A notification received from the transmission node 300A.

Next, it is determined in a processing F501 that a value "500 MB" registered in the available bandwidth 144 of an entry of the transmission network path ID "1000" of the logical path management table 140 is more than or equal to the required bandwidth "100 MB" contained in the path message A notification (F501 No), and the flow proceeds to a processing F507.

In the processing F507, the transmission network path ID "1000" that is the default path is determined as the data transmission logical path, and the logical path management table 140 is updated. Specifically, "A" is registered in the session ID 146 of the entry such that the transmission network path ID 141 of the logical path management table 140 is "1000," "2" is registered in the user class 148, and "100 MB" is registered in the required bandwidth 149. Moreover, "400 MB" that is a value obtained by subtracting the required bandwidth "100 MB" from "500 MB" registered in the available bandwidth 144 of the entry is registered in the available bandwidth 144.

Returning to FIG. 8, a sequence after determining the data transmission logical path as the default path "1000" will be explained.

When receiving the path message A transmitted by processing of S701, the communication node 200C transmits a resource reservation message A to the communication node 200B (S703) The resource reservation message A contains the session identification information (S-ID: A), the identification information (the IP/MPLS network path ID) (IP-ID: 10) if the logical path to be assigned to the session in the IP/MPLS network 20, and a session request bandwidth information (BW: 100 MB). When the transmission node 300B receives the resource reservation message A, the reception packet analysis distribution unit 313 of the transmission node 300B snoops the received resource reservation message A, refers to the logical path setting table 315, specifies the transmission network path (TP-ID: 5000) that is the default path corresponding to the destination network address of the resource reservation message A, and transmits the resource reservation message A to the communication node 200B through the transmission node 300A using the specified transmission network path.

Moreover, the transmission node 300B acquires the session identification information and the IP/MPLS network path ID from the received resource reservation message A, and notifies the managing server 100 of the session identification information and the IP/MPLS network path ID that have acquired as a resource reservation notification A (second control information) (S704).

When the resource reservation notification is notified, the managing server 100 performs a mapping processing that maps the logical path (in FIG. 8, a default path (TP-ID: 1000)) that was determined as the data transmission logical path by the transmission network path determination processing to the logical path of the IP/MPLS network contained in the resource reservation notification (S705).

In the mapping processing, the logical path setting unit 122 of the managing server 100 updates the logical path management table 140 so that the logical path that was determined as the data transmission logical path by the transmission network path determination processing and the logical path of the IP/MPLS network 20 identified by the IP/MPLS network path ID contained in the notified resource reservation notification may be mapped to each other. Specifically, the logical path setting unit 122 registers the IP/MPLS network path ID contained in the notified resource reservation notification in the IP/MPLS network path ID 147 of an entry corresponding to the logical path that is determined as the data transmission logical path by the transmission network path determination processing among entries in the logical path management table 140.

As shown in FIG. 10B, when the managing server 100 receives the resource reservation message A notified by a processing of S704 shown in FIG. 8, "10" is registered in the IP/MPLS network path ID 147 of an entry where "1000" was registered in the transmission network path ID 141 of the logical path management table 140.

Moreover, the logical path setting unit 122 of the managing server 100 transmits a command (a logical path setting table update command) to update the logical path setting table 315 of the transmission node 300 that forms the route of the data transmission logical path to the transmission node 300 that forms the route of the data transmission logical path through the node setting unit 110 so that the logical path determined as the data transmission logical path by the transmission network path determination processing and the logical path of the IP/MPLS network 20 identified by the IP/MPSL network ID contained in the notified resource reservation notification may be mapped to each other.

A command to update the logical path setting table transmitted when the managing server 100 receives the resource reservation message A notified by the processing of S704 shown in FIG. 8 is a command to register "10" in the IP/MPLS network path ID 502 of an entry where "1000" was registered in the transmission network path ID 501 of the logical path setting table 315.

The data transmission logical path and the IP/MPLS network path in the transmission network 30 are mapped to each other by the above.

After this, when the transmission node 300A receives a data packet A of the session that is identified by the session identification information (S-ID: A), the MPLS-TP encapsulation unit 314 of the transmission node 300A refers to the logical path setting table 315, encapsulates it so that it may be transmitted by use of the default path identified by the transmission network path ID "1000," and transmits the data packet A (S706).

Next, the transmission node 300A receives a path message B from the communication node 200B. The path message B contains the required bandwidth information (BW: 500 MB) of the session, the class information (Class: 4) of the session, and session identification information (S-ID: B). The transmission node 300A transmits the received path message B using the default path (TP-ID: 1000) (S707), and notifies the managing server 100 of the session identification information, the class information, and the required bandwidth information contained in the path message B, and a path message B notification containing the identification information of the transmission network path corresponding to a destination network of the path message B (S708).

Figure 9:
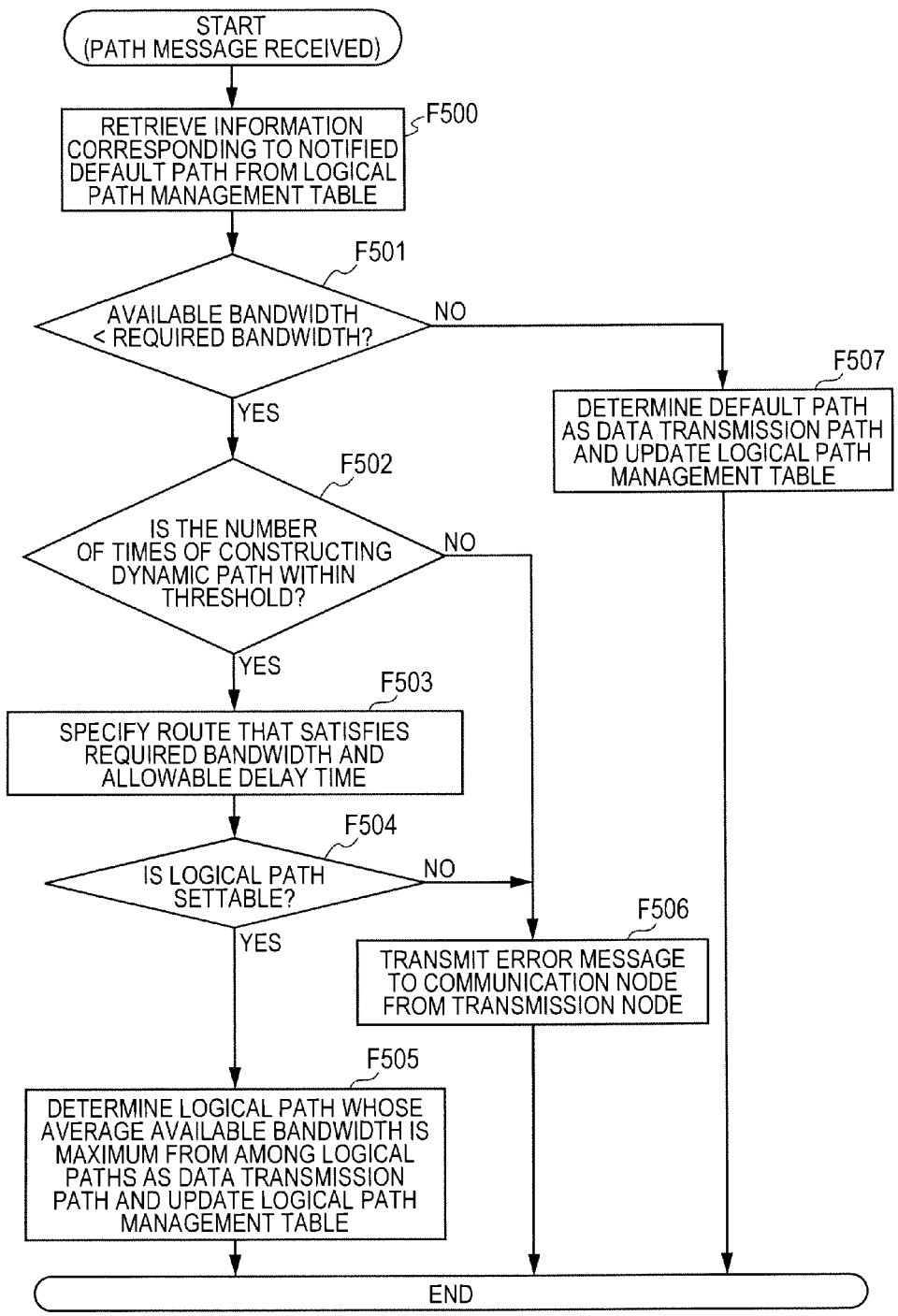
FIG. 9 is a flowchart of a transmission network path determination processing by a managing server of the first embodiment of the present invention.

When receiving the path message B notification, the managing server 100 performs the transmission network path determination processing shown in FIG. 9.

First, in the processing F500, the transmission network path ID "1000" is specified as the default path that coincides with the identification information of the transmission network path corresponding to the destination network of the path message B notification received from the transmission node 300A.

Next, in the processing F501, it is determined that a value "400 MB" registered in the available bandwidth 144 of the entry of the transmission network path ID "1000" of the logical path management table 140 is smaller than the required bandwidth "500 MB" contained in the path message B notification (F501: Yes), and the flow proceeds to the processing F502, where the logical path is dynamically constructed (S709 shown in FIG. 8).

In the processing F502, it shall be determined that the number of times that the logical path was dynamically set up during a time period from current time to current time minus a predetermined time is less than or equal to the threshold previously set as the dynamic setting constraint (F502: Yes), and the flow proceeds to the processing F503.

In the processing F503, a route that satisfies the notified required bandwidth and the allowable delay time corresponding to the class information is specified from among routes running from the input transmission node to the output transmission node. For this reason, in the processing F504, it is determined that the logical path is dynamically settable (F504: Yes), and the flow proceeds to the processing F505. In the processing F505, when there are multiple routes specified by the processing F503, a route whose average delay time of links that form the routes becomes a maximum is determined as the data transmission logical path, and the logical path management table 140 is updated. Incidentally, when the route specified by the processing F503 is only one, the route is determined as the data transmission logical path.

FIG. 10C shows the logical path management table 140 updated by the processing F505. In this processing F505, a new entry is added to the logical path management table 140, "2000" is registered in the transmission network path ID 141 of the added entry, the identification information of the input transmission node contained in the path message B notification is registered in the input node ID 142, and the identification information of the output transmission node of the transmission network path ID contained in the path message B notification is registered in the output node ID 143. Moreover, "0" is registered in the available bandwidth 144 of the entry, the session identification information "B" contained in the path message B notification is registered in the session ID 146, the class information "4" contained in the path message B notification is registered in the user class 148, the required bandwidth information "500 MB" contained in the path message B notification is registered in the required bandwidth 149, and a link forming the route that the data transmission logical path uses is registered in the use link 155.

Next, a sequence after the data transmission logical path is determined as the dynamic path "2000" will be explained.

When receiving the path message B transmitted by a processing of S707, the communication node 200C transmits a resource reservation message B to the communication node 200B (S710). The resource reservation message B contains the session identification information (S-ID: B), the IP/MPLS network path ID (IP-ID: 20) that is assigned to the session, and the session required bandwidth information (BW: 500 MB). The transmission node 300B specifies the transmission network path (TP-ID: 5000), transmits the resource reservation message B to the communication node 200B through the transmission node 300A using the specified transmission network path, acquires the session identification information (S-ID: B) and the IP/MPLS network path ID (IP-ID: 20) from the received resource reservation message B, and notifies the acquired session identification information and IP/MPLS network path ID to the managing server 100 as a resource reservation notification B (S711).

When the resource reservation notification B is notified, the managing server 100 performs the mapping processing (S712).

In this mapping processing, as shown in FIG. 10D, "20" is registered in the IP/MPLS network path ID 147 of an entry where "2000" was registered in the transmission network path ID 141 of the logical path management table 140.

Moreover, the managing server 100 transmits the logical path setting table update command to update the logical path setting table 315 so that the transmission network path ID "2000" and the IP/MPLS network path ID "20" may be mapped to each other to the transmission node 300 that forms a route of the data transmission logical path dynamically constructed through the system setting unit 110.

The command to update the logical path setting table transmitted when the managing server 100 receives the resource reservation message B notified by a processing of S711 shown in FIG. 8 is a command to register "20" in the IP/MPLS network path ID 502 of an entry where "2000" was registered in the transmission network path ID 501 of the logical path setting table 315.

The data transmission logical path that is dynamically constructed in the transmission network 30 and the IP/MPLS network path are mapped to each other.

The default path (TP-ID: 1000) that is constructed in the transmission network 30 by the above processings S701 to S712 and an IP/MPLS network path (IP-ID: 10) are mapped to each other. The dynamic path (TP-ID: 2000) dynamically constructed in the transmission network 30 and the IP/MPLS network path (IP-ID 20) are mapped to each other. For this reason, the transmission node 300A transmits the data packet A to which the IP/MPLS network path ID "10" was given to the communication node 200C using the default path (TP-ID: 1000) (S713), and transmits a data packet B to which the IP/MPLS network path ID "20" was given to the communication node 200C using the dynamic path (TP-ID: 2000) (S713).

By the above processing, normally, the default path that is statically set up is mapped to the IP/MPLS network path, and when the available bandwidth of the default path runs short and then when information about the logical path that is dynamically constructed satisfies the dynamic setting constraint, a logical path that uses a path satisfying the allowable delay time of the session is dynamically constructed and the dynamically constructed logical path is mapped to the IP/MPLS network path. This enables the resource of the transmission network 30 to be used effectively while controlling the load of the managing server, and enables traffic in the transmission network 30 to be distributed.

Second Embodiment

A second embodiment of the present invention will be explained using FIG. 11 and FIG. 12.

This embodiment is characterized in that when the managing server 100 receives the path message notification containing the class information showing a priority higher than or equal to a specified value, only the default path is assigned to the session that is established by the path message notification.

Specifically, when the available bandwidth of the default path is more than or equal to the required bandwidth contained in the path message notification, the default path is determined as the data transmission logical path.

On the other hand, when the available bandwidth of the default path is smaller than the required bandwidth contained in the path message notification, if the available bandwidth of the default path becomes larger than or equal to the required bandwidth within a predetermined time, the default path will be determined as the data transmission logical path.

Incidentally, when the available bandwidth of the default path does not become more than or equal to the required bandwidth within a predetermined time, the managing server 100 transmits an error message to the transmission node 300. Moreover, during this predetermined time, when the managing server 100 receives an other path message notification, a route is set up by excluding a link that the default path uses from the logical path assigned to a session that is established by the other path message notification.

Since this determines the default path as the data transmission logical path for the session that is established by the path message containing the class information indicating a priority more than or equal to a predetermined value, the delay time by the data transmission logical path can be made a minimum.

Incidentally, the configuration of the transmission system of this embodiment is the same as that of the transmission system of the first embodiment. As a functional difference between this embodiment and the first embodiment, the transmission packet analysis distribution unit 320 of the transmission node 300 holds the resource reservation message for a predetermined time or discards the resource reservation message based on a command from the managing server 100. Furthermore, the transmission packet analysis distribution unit 320 transmits an error message to the communication node 200. Moreover, the logical path setting unit 122 of the managing server 100 transmits a command to hold or transmit the resource reservation message to the transmission packet analysis distribution unit 320 of the transmission node 300.

Figure 11:
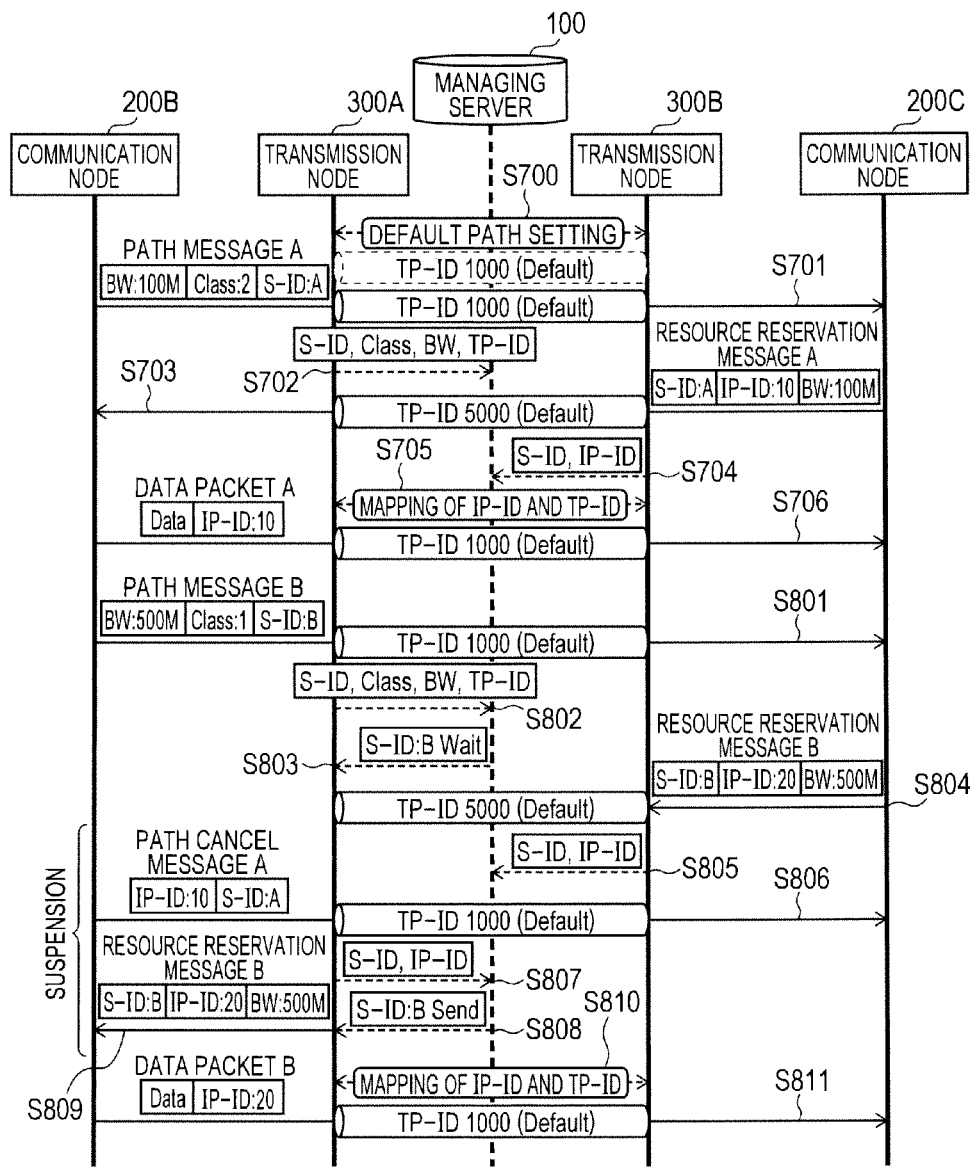
FIG. 11 is a sequence diagram of a transmission network path construction processing of a second embodiment of the present invention.

FIG. 11 is a sequence diagram of a transmission network path construction processing of the second embodiment of the present invention. FIG. 12 is a flowchart of the transmission network path determination processing by the managing server 100 of the second embodiment of the present invention. Incidentally, the same processing in the transmission network path construction processing shown in FIG. 11 as that of the transmission network path construction processing shown in FIG. 8 of the first embodiment is given the same symbol, and its explanation is omitted. Moreover, the same processing part in the transmission network path determination processing shown in FIG. 12 as that of the transmission network path determination processing shown in FIG. 9 of the first embodiment is given the same symbol, and its explanation is omitted.

First, the transmission network path determination processing of this embodiment will be explained using FIG. 12.

The logical path setting unit 122 determines whether there exists a session that is suspended for a predetermined time until the available bandwidth of the default path specified by the processing F500 becomes more than or equal to the required bandwidth (F600).

When it is determined in the processing F600 that there does not exist a suspended session for the predetermined time until the available bandwidth of the default path specified by the processing F500 becomes more than or equal to the required bandwidth (F600: No), the logical path setting unit 122 proceeds to the processing F501 and determines whether the available bandwidth of the default path is smaller than the required bandwidth. When it is determined that the available bandwidth of the default path is more than or equal to the required bandwidth by the processing F501 (F501: No), the logical path setting unit 122 proceeds to the processing F507, determines the default path as the data transmission logical path, updates the logical path management table 140, and ends the processing.

On the other hand, either when it is determined in the processing F501 that the available bandwidth of the default path is smaller than the required bandwidth (F501: Yes) or when it is determined in the processing F500 that there does not exist a suspended session for the predetermined time until the available bandwidth of the default path specified by the processing F500 becomes more than or equal to the required bandwidth (F600: Yes), the logical path setting unit 122 determines whether the class information contained in the notified path message notification is "1" showing a highest priority (F601).

In the processing F500, when it is determined that the class information contained in the notified path message notification is "1" (F601: Yes), even when the logical path setting unit 122 receives the resource reservation message A in its input transmission node of the default path specified by the processing F500, it transmits a command to suspend transmission that is a command to suspend transmission of the resource reservation message for a predetermined time (F603).

Then, the logical path setting unit 122 determines whether a predetermined time elapsed after performing a processing F603 and the processing timed out (F604).

When it is determined in a processing F604 that the processing has timed out (F604: Yes), the logical path setting unit 122 proceeds to the processing F506, where it transmits to the transmission node 300 the command to transmit an error message to the communication node 200, and ends the processing.

On the other hand, when it is determined in the processing F604 that the processing does not time out (F604: No), the logical path setting unit 122 determines whether the available bandwidth of the default path specified by the processing F500 is smaller than the required bandwidth (F605).

When it is determined in the processing F605 that the available bandwidth of the default path specified by the processing F500 is more than or equal to the required bandwidth (F605: No), the logical path setting unit 122 determines the default path as the data transmission logical path, updates the logical path management table 140 (F606), and ends the processing. Since the processing F606 is the same as the processing F507, its detailed explanation is omitted.

When it is determined in the processing F605 that the available bandwidth of the default path specified by the processing F500 is smaller than the required bandwidth (F605: Yes), the logical path setting unit 122 repeatedly performs the processings F604 and F605 until a predetermined time elapses.

When it is determined in a processing F601 that the class information contained in the notified path message notification is not "1" (F601: No), in order to dynamically construct the logical path, the logical path setting unit 122 notifies the dynamic path determination/generation unit 125 of the required bandwidth information, the identification information of the input transmission node, the identification information of the output transmission node contained in the path message notification, and the class information contained in the path message notification, and proceeds to the processing F502.

In the processing F502, the logical path setting unit 122 determines whether the number of times that the logical path was dynamically set up during a time period from current time to current time minus a predetermined time is less than or equal to the threshold previously set as the dynamic setting constraint.

When it is determined in the processing F502 that the number of times that the logical path was dynamically set up during a time period from current time to current time minus a predetermined time is larger than a threshold (F502: No), the logical path setting unit 122 proceeds to the processing F506, where it transmits to the transmission node 300 a command to transmit an error message to the communication node 200, and ends the processing.

On the other hand, when it is determined in the processing F502 that the number of times that the logical path was dynamically set up during a time period from current time to current time minus a predetermined time is less than or equal to the threshold (F502: Yes), the dynamic path determination/generation unit 125 refers to the link management table 150, specifies a route that satisfies the notified required bandwidth and the allowable delay time corresponding to the notified class information from among routes running from the input transmission node to the output transmission node from which a link forming the default path that the suspended session uses is excluded (F602), and proceeds to the processing F504.

When it is determined in the processing F504 that the route cannot be specified by the processing F503, the logical path setting unit 122 proceeds to the processing F504 (F504: No), where it transmits to the transmission node 300 a command to transmit an error message to the communication node 200, and ends the processing.

On the other hand, when it is determined in the processing F504 that the route can be specified by the processing F503 (F504: Yes), the dynamic path determination/generation unit 125 determines that the logical path is dynamically settable, and proceeds to the processing F505.

In the processing F505, the dynamic path determination/generation unit 125 refers to the link management table 150, calculates the average delay time of the specified route, determines a route whose calculated average delay time becomes a maximum as the data transmission logical path, updates the logical path management table 140, and ends the transmission network path determination processing.

Next, the transmission network path construction processing in the transmission system will be explained using FIG. 11. In FIG. 11, the default path (TP-ID: 1000) is assigned as a logical path of the session A in which the communication node 200B transmits data to the communication node 200C by performing the processings of S700 to S706. In this embodiment, processings after the processing of S801 will be explained.

When receiving the path message B from the communication node 200B, the transmission node 300A transmits the received path message B to the communication node 200C using the default path (TP-ID: 1000) (S801). The path message B contains the required bandwidth information (BW: 100 MB) of the session, the class information (Class: 1) of the session, and the session identification information (S-ID: B).

Moreover, the transmission node 300A notifies the managing server 100 of the session identification information, the class information, and the required bandwidth information acquired from the path message B and the path message B notification that contains the identification information of the transmission network path corresponding to the destination network of the path message B (S802).

Figure 12:
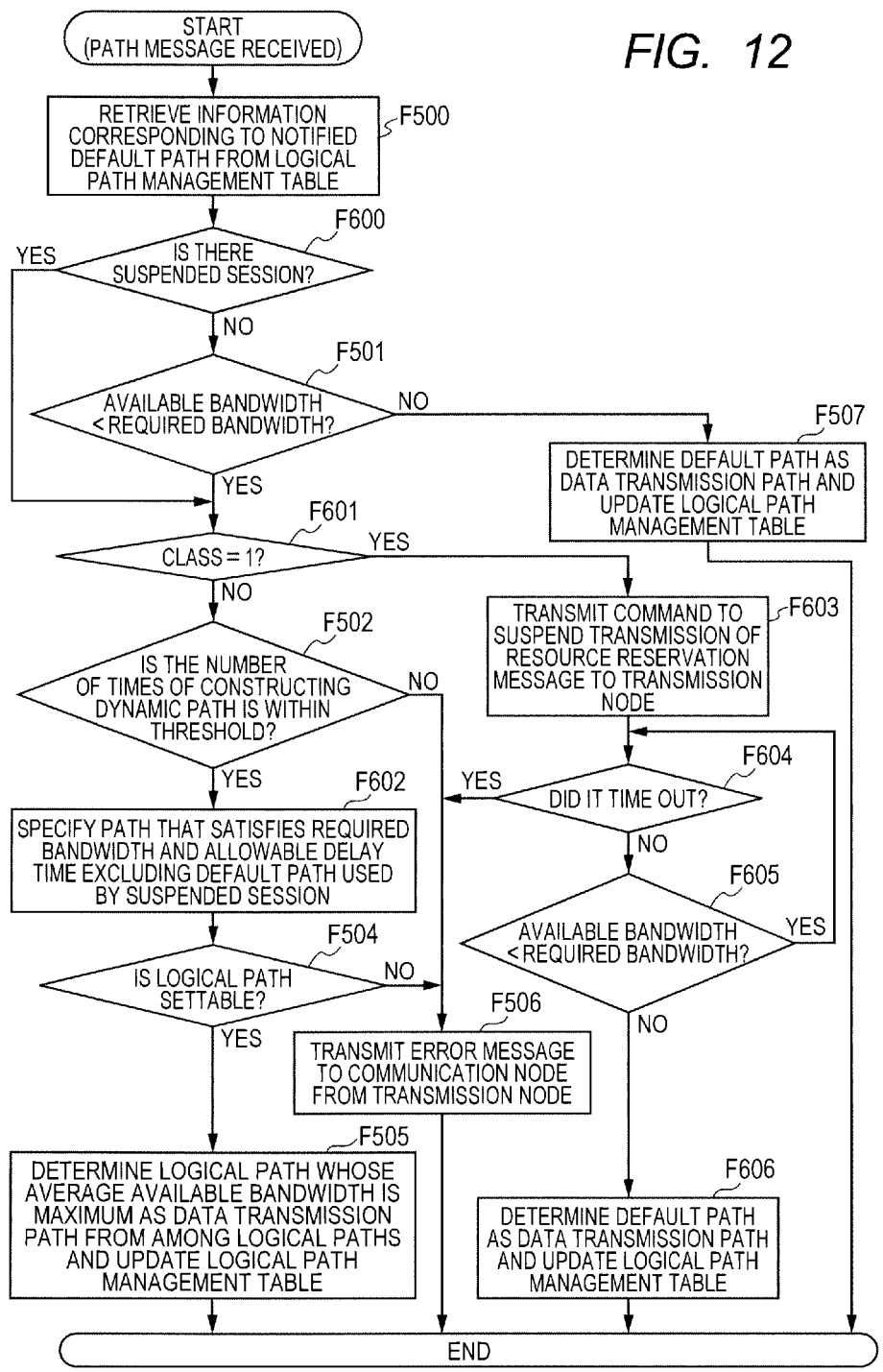
FIG. 12 is a flowchart of a transmission network path determination processing by a managing server of the second embodiment of the present invention.

When receiving the path message B notification, the managing server 100 performs the transmission network path determination processing shown in FIG. 12.

First, in the processing F500, the transmission network path ID "1000" is specified as the default path that coincides with the identification information of the transmission network path corresponding to the destination network of the path message B notification received from the transmission node 300A.

Next, in the processing F600, it is determined whether there exists a suspended session to the default path (TP-ID: 1000) specified by the processing F500. Here, it is determined that there does not exist the suspended session to the default path (F600: No), and the flow proceeds to the processing F501.

In the processing F501, it is determined that the value "400 MB" registered in the available bandwidth 144 of the entry of the transmission network path ID "1000" of the logical path management table 140 is smaller than the required bandwidth "500 MB" contained in the path message B notification (F501: Yes), and the flow proceeds to the processing F601.

In the processing F601, it is determined that the class information contained in the notified path message notification is "1" showing the highest priority (F601: Yes), and the flow proceeds to the processing F603.

In the processing F603, a command to suspend the transmission of the resource reservation message is transmitted to the transmission node 200A serving as an input transmission node (S803 shown in FIG. 11), and the flow proceeds to the processing F604. The command to suspend the transmission of the resource reservation message contains the session identification information (S-ID: B).

Here, in FIG. 11, the transmission node 300B receives the resource reservation message B transmitted from the communication node 200C, and transmits the resource reservation message B to the communication node 200B through the default path (TP-ID: 5000) (S804). However, the transmission node 300A suspends the transmission of the resource reservation message based on the command to suspend the transmission of the resource reservation message. Moreover, the transmission node 300B transmits the resource reservation notification B to the managing server 100 (S805).

Next, in the processings F604 and F605, a determination processing as to whether the available bandwidth of the default path (TP-ID: 1000) is smaller than the required bandwidth is performed repeatedly during a predetermined time.

In FIG. 11, during this predetermined time, the communication node 200B shows that the communication of the session A is completed, and transmits a path cancel message A that the logical path of the session A is cancelled to the communication node 200C through the default path (TP-ID: 1000). The path cancel message A contains the IP/MPLS network path ID (IP-ID: 10) assigned to the session A and the session identification information (S-ID: A). The transmission node 300A transmits the path cancel message A notification to the managing server 100 (S807). The path cancel message A notification contains the IP/MPLS network path ID (IP-ID: 10) contained in the path cancel message A and the session identification information (S-ID: A). When receiving the path cancel message A notification, the managing server 100 cancels the logical path (default path (TP-ID: 1000)) of the session A. Specifically, the logical path setting unit 122 deletes information registered in the session ID 146, the IP/MPLS network path ID 147, the user class 148, and the required bandwidth 149 of an entry where the identification information of the session registered in the session ID 146 coincides with the session identification information (S-ID: A) contained in the path cancel message A notification from among entries registered in the logical path management table 140, and adds a value registered in the required bandwidth 149 of the entry to the available bandwidth 144 of the entry. Moreover, the managing server 100 transmits a command to delete a mapping relation between the transmission network path ID of the session and the IP/MPLS network path ID from the logical path setting table 315 to the transmission node 300 that forms the route of the default path. This updates the information registered in the logical path management table 140 shown in FIG. 10B to the information registered in the logical path management table 140 shown in FIG. 10A.

Since when the logical path of the session A is cancelled, the available bandwidth of the default path (TP-ID: 1000) becomes "500 MB" and the required bandwidth becomes more than or equal to "500 MB," it is determined in the processing F605 that the available bandwidth of the default path (TP-ID: 1000) is more than or equal to the required bandwidth (F605: No), and the flow proceeds to the processing F606. In the processing F606, the transmission network path ID "1000" that is the default path is determined as the data transmission logical path, and the logical path management table 140 is updated. Specifically, "B" is registered in the session ID 146 of an entry whose transmission network path ID 141 of the logical path management table 140 is "1000," "1" is registered in the user class 148, and "500 MB" is registered in the required bandwidth 149. Moreover, "0 MB" that is a value obtained by subtracting the required bandwidth "500 MB" from "500 MB" registered in the available bandwidth 144 of the entry is registered in the available bandwidth 144.

Moreover, when it is determined in the processing F605 that the available bandwidth of the default path (TP-ID: 1000) is more than or equal to the required bandwidth (F605: No), the logical path setting unit 122 transmits a command to cancel the suspension to the transmission node 300A that has been suspended from transmitting the resource reservation message B (S808). The command to cancel the suspension contains the session identification information (S-ID: B). When receiving the command to cancel the suspension, the transmission node 300A transmits the resource reservation message B whose transmission has been suspended to the communication node 200B (S809).

After determining the data transmission logical path, the managing server 100 updates the logical path management table 140 based on the received resource reservation message B so that a data transmission logical path (TP-ID: 1000) and an IP/MPLS network path (IP-ID: 20) may be mapped to each other. Moreover, the managing server 100 transmits the command to update the logical path setting table 315 to the transmission node 300 that forms a route of the data transmission logical path so that the data transmission logical path (TP-ID: 1000) and the IP/MPLS network path (IP-ID: 20) may be mapped to each other (S810).

After this, when the transmission node 300A receives the data packet B of the session identified by the session identification information (S-ID: B), the MPLS-TP encapsulation unit 314 of the transmission node 300A refers to the logical path setting table 315, encapsulates it so that it can be transmitted using the default path identified by the transmission network path ID "1000", and transmits the data packet A (S811).

Incidentally, in FIG. 12, when it is determined in the processing F601 that a priority of class information of the session is the highest, the processings F603 to F606 are performed, but when the class information of the session is more than or equal to a predetermined priority, it may be configured that the processings F603 to F606 are performed.

In this case, in the processing F602, only when the priority of the class information contained in the path message notification is lower than the priority of the class information of the suspended session, a route that satisfies the notified required bandwidth and the allowable delay time corresponding to the notified class information may be specified from among routes running from the input transmission node to the output transmission node from which the link forming the default path that the suspended session uses is excluded. When the priority of the class information contained in the path message notification is more than or equal to the priority of the class information of the suspended session, a route that satisfies the notified required bandwidth and the allowable delay time corresponding to the notified class information is specified from among routes running from the input transmission node to the output transmission node.

By the above procedures, the default path is determined as the data transmission logical path to the session established by the path message containing the class information indicating the priority more than or equal to a predetermined value, and therefore, it is possible to minimize the delay time by the data transmission logical path.

Third Embodiment

A third embodiment of the present invention will be explained using FIG. 13.

This embodiment is a modification of the dynamic setting constraint of the first embodiment and the second embodiment, and the dynamic setting constraint of this embodiment is a condition that a total reservation bandwidth of a dynamic path constructed between two arbitrary transmission nodes 300 shall be less than or equal to a threshold. Specifically, in this embodiment, both when the available bandwidth of the default path is smaller than the required bandwidth and when the total reservation bandwidth of the logical path dynamically constructed as a logical path in place of the default path is larger than a threshold, a new logical path is not dynamically constructed. By this, it is made possible to control consumption of the available bandwidth of an other default path in the transmission network 30 and to make it easy to assign the default path to a session whose priority is high.

A configuration of the transmission system of this embodiment is the same as that of the transmission systems of the first embodiment and the second embodiment. As a functional difference between this embodiment and the first and the second embodiments, the dynamic path determination/generation unit 125 of the managing server 100 holds a threshold of the total reservation bandwidth of the dynamic path dynamically constructed between the input transmission node and the output transmission node of the default path, and when being instructed to generate a dynamic path from the logical path setting unit 122, it refers to the logical path management table 140, calculates the total reservation bandwidth of the dynamic path being set up between the pertinent two transmission nodes 300, and compares the calculated total reservation bandwidth and the threshold.

The transmission network path determination processing of this embodiment will be explained using FIG. 13. FIG. 13 is a flowchart of the transmission network path determination processing of the third embodiment of the present invention. The same processing part in the transmission network path determination processing shown in FIG. 13 as that of the transmission network path determination processing of the first embodiment shown in FIG. 9 is given the same symbol, and its explanation is omitted.

A processing F508 of the transmission network path determination processing shown in FIG. 13 is different from a counterpart of the transmission network path determination processing shown in FIG. 9.

In the processing F508, the dynamic path determination/generation unit 125 determines whether the total reservation bandwidth of the dynamic path dynamically constructed between the input transmission node and the output transmission node of the default path that were specified by the processing F500 is less than or equal to a threshold.

When it is determined in the processing F508 that the total reservation bandwidth of the dynamic path dynamically constructed between the input transmission node and the output transmission node of the default path that are specified by the processing F500 is less than or equal to the threshold (F508: Yes), the dynamic path determination/generation unit 125 proceeds to the processing F503 and specifies the route that the dynamic path uses. On the other hand, when it is determined in the processing F508 that the total reservation bandwidth of the dynamic path dynamically constructed between the input transmission node and the output transmission node of the default path that are specified by the processing F500 is larger than the threshold (F508: No), the dynamic path determination/generation unit 125 proceeds to the processing F506 and transmits the command to transmit an error message to the transmission node 300.

Incidentally, this embodiment can also be applied to the second embodiment, and in this case, the processing F502 shown in FIG. 12 is replaced with the processing F508 shown in FIG. 13.

Fourth Embodiment

In the first to the third embodiments, the logical path that uses the shortest route between the two transmission nodes is set up as the default path, and when the available bandwidth of the default path that coincides with the default path identification information contained in the path message notification is smaller than the required bandwidth contained in the path message notification, if there arises coincidence of the predetermined condition, a logical path in the transmission network 30 that uses a route different from the route used by the default path is newly constructed.

In this embodiment, the logical paths are set up in advance to multiple routes between the two transmission nodes, and when the available bandwidth of the default path serving as the shortest route is smaller than the required bandwidth contained in the path message notification, a logical path that uses a route different from the route used by the default path is selected from among the logical paths previously set.

FIG. 14 is an explanatory drawing of the logical path management table 140 after initialization by the managing server 100 of a fourth embodiment of the present invention.

In the initialization by the managing server 100, two logical paths (TP-ID: 1000 and 2000) shall be constructed between the input transmission node (TP1) and the output transmission node (TP2).

Here, the logical path management table 140 contains a default path 156 in which information for distinguishing whether the logical path is the default path using the shortest route between the two transmission nodes 300 is registered, as shown in FIG. 14. Specifically, "Y" is registered in the default path 156 of the entry of the logical path that is the default path, and "N" is registered in the default path 156 of the entry of the logical path that is not the default path. "Y" is registered in the default path 156 of TP-ID 1000 in FIG. 14.

Next, a difference between the logical path determination processing of this embodiment and the logical path determination processing shown in FIG. 9 will be explained using FIG. 9.

In the processing F500, the logical path setting unit 122 specifies an entry where the transmission network path identification information registered in the transmission network path ID 141 of the entry where "Y" is registered in the default path 156 of the logical path management table 140 coincides with the default path identification information contained in the path message notification.

In the processing F503, the dynamic path determination/generation unit 125 selects entries in each of which the input node ID 142 and the output node ID 143 coincide with the identification information of the input transmission node and the identification information of the output transmission node notified from the logical path setting unit 122, respectively, from among the entries registered in the logical path management table 140 such that "N" is registered in the default path 156.

Then, the dynamic path determination/generation unit 125 specifies an entry such that the link registered in the use link 155 satisfies the required bandwidth notified from the logical path setting unit 122 and the allowable delay time corresponding to the notified class information from the selected entries.

The idea that the logical path serving as a data transmission route is selected from among the logical paths previously set in the transmission network 30 like this embodiment shall be included in an idea that the managing server 100 dynamically constructs the logical path in the transmission network 30.

Incidentally, each embodiment described above is a suitable embodiment of the present invention, and it can be modified within a range that does not deviate from a gist of the present invention.

What is claimed is:
1. A transmission system that comprises a plurality of transmission nodes each serving as a component of a transmission network, and
a managing computer,
wherein the managing computer is configured to:
construct a plurality of default logical paths in the transmission network by constructing one default logical path between each of two arbitrary transmission nodes, each arbitrary transmission node connected to a communication node in advance,
store correspondence information between default logical path identification information to identify one of the plurality of default logical paths and a destination of data passing through the one of the plurality of default logical paths, and
set up a threshold condition about a logical path dynamically constructed in the managing computer in advance,
wherein when a first of the plurality of the transmission nodes connected to a first communication node receives control information to establish a session between the first communication node and a second communication node from the first communication node, the control information containing a destination of data and a guaranteed bandwidth of the session between the first communication node and the second communication node, the first transmission node is configured to transmit the received control information to the managing computer, and wherein when the managing computer receives the control information from the first transmission node, the managing computer is configured to:

specify one of the plurality of the default logical paths corresponding to the destination contained in the control information based on the correspondence information, when an available bandwidth of the specified default logical path is more than or equal to the guaranteed bandwidth contained in the control information, set up to the first transmission node, and a second transmission node, connected to the second communication node to be mapped the specified default logical path and a second logical path to identify a communication route from the first communication node to the second communication node, and when the available bandwidth of the specified default path is smaller than the guaranteed bandwidth contained in the control information and then when a specific value about the first logical path which has been dynamically constructed is less than or equal to the threshold condition about the logical path dynamically constructed in the managing computer in advance, dynamically construct a first logical path between the first transmission node and the second transmission node, the first logical path is different from the specified default path, and set up to the first communication node and the second transmission node connected to the second communication node to be mapped to the first logical path and a second logical path to identify the communication route from the first communication node to the second communication node.

2. The transmission system according to claim 1,
wherein the control information contains a class showing a priority of the session that is established,
wherein the managing computer stores an allowable amount of delay caused by the transmission network of each class showing a priority of the session, and stores link management information in which an available bandwidth of a link between two arbitrary adjacent transmission nodes that form the transmission network and an allowable amount of delay caused by the link are registered,
wherein the managing computer is configured to:
when dynamically constructing the first logical path, refer to the link management information, select a route comprised of a link having a bandwidth more than or equal to the guaranteed bandwidth contained in the control information, calculate a total delay amount of the link that forms the selected route based on the link management information, and specify a route such that the calculated total delay amount becomes less than or equal to the allowable amount of delay of a class contained in the control information, and
when there are a plurality of the specified routes, dynamically construct a logical path that uses a route such that an average of the available bandwidth of the link forming the route becomes a maximum as the first logical path.

3. The transmission node according to claim 2,
wherein the managing computer is configured to:
(1) when the managing computer receives control information containing a class such that the session to be established is of a predetermined priority or moere higher and then when the available bandwidth of the specified default path is smaller than the guaranteed bandwidth contained in the control information, suspend the processing for a predetermined time, (2) when the managing computer receives newly control information within the predetermined time, exclude a logical path that contain the specified default path corresponding to the control information that acts as a trigger to suspend the processing and a logical path containing a link forming a route that the default path uses from candidates of the first logical path for the newly received control information, (3) when the available bandwidth of the specified default path becomes more than or equal to the guaranteed bandwidth contained in the control information within the predetermined time, establish the communication session by setting up a transmission node that forms the specified default path so that the specified default path may be mapped to the second logical path, (4) when the available bandwidth of the specified default path does not become more than or equal to the guaranteed bandwidth contained in the control information within the predetermined time, cancel the suspension and transmits error information indicating an error to the transmission node having transmitted the control information, and (5) when the transmission node receives the error information, transmit the error information to the communication node having transmitted the control information.

4. The transmission system according to claim 1,
wherein the condition about the dynamically constructed first logical path is that the number of times that the managing computer dynamically constructs the first logical path within a predetermined time is less than or equal to a predetermined value.

5. The transmission system according to claim 1,
wherein the condition about the dynamically constructed first logical path is that a total of the guaranteed bandwidths of the dynamically constructed first logical path when an available bandwidth of one default path is smaller than a guaranteed bandwidth contained in the control information is less than or equal to a predetermined value.

6. The transmission system according to claim 1,
wherein the communications protocol used in the communications network is IP/MPLS.

7. The transmission system according to claim 1,
wherein the communications protocol used in the transmission network is MPLS-TP.

8. The transmission system according to claim 1,
wherein a protocol that sets up the second logical path is either RSVP-TE or CR-LDP.

9. A managing computer in a transmission system having a plurality of transmission nodes each serving as a component of a transmission network, the managing computer comprising:
memory storage; and
a processor,
the managing computer configured to:
set up a condition about the first logical path dynamically constructed in the managing computer in advance, and
construct a plurality of default logical paths in the transmission network by constructing one default logical path between each of two arbitrary transmission nodes, each arbitrary transmission node connected to a communication node of a communication network in advance,
store correspondence information between default logical path identification information to identify one of the plurality of default logical paths and a destination of data passing through one of the plurality of default logical paths, set up a threshold condition about a logical path dynamically constructed in the managing computer in advance, when a first communication node of the communication network has established a session with a second communication node of the communication network and then when control information to establish the session is transmitted from the first communication node, the control information containing a destination of data and a guaranteed bandwidth of the session between the first communication node and the second communication node, is received by the management computer, specify one of the plurality of the default logical paths corresponding to the destination contained in the control information based on the correspondence information, when an available bandwidth of the specified default logical path is more than or equal to the guaranteed bandwidth contained in the control information, set up to the first transmission node, and a second transmission node, connected to the second communication node to be mapped the specified default logical path and a second logical path to identify a communication route from the first communication node to the second communication node, and when the available bandwidth of the specified default path is smaller than the guaranteed bandwidth contained in the control information and then when a specific value about the already dynamically constructed logical path is less than or equal to the threshold condition about the logical path dynamically constructed in the managing computer in advance, dynamically construct a first logical path between the first transmission node and the second transmission node, the first logical path is different from the specified default path, as and set up to the first communication node and the second transmission node connected to the second communication node to be mapped to the first logical path and a second logical path to identify the communication route from the first communication node to the second communication node.

10. The managing computer according to claim 9,
wherein the control information contains a class indicating a priority of the session that is established, and
wherein managing computer is configured to:
store an allowable amount of delay caused by the transmission network for each class indicating the priority of the session, and stores link management information in which an available bandwidth of a link between two arbitrary adjacent transmission nodes forming the transmission network and an allowable amount of delay caused by the link, when dynamically constructing the first logical path, select a route comprised of a link having an available bandwidth more than or equal to the guaranteed bandwidth contained in the control information by referring to the link management information, calculate a total delay amount of a link that forms the selected route, and specify a route such that the calculated total delay amount becomes less than or equal to a delay of the class contained in the control information, and when there are a plurality of the specified routes, dynamically construct a logical path that uses a route such that an average of the available bandwidth of a link that forms the route becomes a maximum as the first logical path.

11. The managing computer according to claim 10,
wherein the managing computer is configured to:
when the managing computer receives the control information containing a class such that the session being established shows a priority higher than a predetermined priority and then when the available bandwidth of the specified default path is smaller than the guaranteed bandwidth contained in the control information, suspend a processing for a predetermined time, when the managing computer receives control information newly within the predetermined time, exclude a logical path that contains a default path corresponding to the control information that triggers suspension of the processing and a link forming a route that the default path uses from candidates of the first logical path to the newly received control information, when the available bandwidth of the specified default path becomes more than or equal to the guaranteed bandwidth contained in the control information within the predetermined time, set up a transmission node forming the specified default path so that the specified default path may be mapped to the second logical path, and when the available bandwidth of the specified default path does not become more than or equal to the guaranteed bandwidth contained in the control information within the predetermined time, cancel the suspension and transmits a command to transmit error information indicating an error to a communication node that transmitted the control information to the transmission node having transmitted the control information.

12. A logical path construction method in a managing computer in a transmission system having a plurality of transmission nodes each serving as a component of a transmission network, the computer having a memory storage and a processor, wherein a condition on the first logical path being dynamically constructed is set up in the managing computer in advance, wherein the managing computer store constructs a plurality of default logical paths in the transmission network by constructing one default logical path between each of two arbitrary transmission nodes, each arbitrary transmission node connected to a communication node of a communication network in advance, stores correspondence information between default logical path identification information to identify one of the plurality of default logical paths and a destination of data passing through one of the plurality of default logical paths, and sets up a threshold condition about a logical path dynamically constructed in the managing computer in advance, wherein the method comprises:
a first step that when a first communication node of the communication network establishes the session with a second communication node of the communication network and then when the managing computer receives control information that is sent from the first communication node, the control information containing a destination of data and a guaranteed bandwidth of the session between the first communication node and the second communication node, the managing computer specifies one of the plurality of the default logical paths corresponding to the destination contained in the control information based on the correspondence information;

a second step that when an available bandwidth of the default logical path specified in the first step is more than or equal to the guaranteed bandwidth contained in the control information, the managing computer sets up to the first transmission node, and a second transmission node, connected to the second communication node to be mapped the default logical path specified in the first step and a second logical path to identify a communication route in the communication network from the first communication node to the second communication node;

a third step that when the available bandwidth of the default path specified in the first step is smaller than the guaranteed bandwidth contained in the control information and then when information about the logical path having been already dynamically constructed with is less than or equal to the threshold condition about the logical path dynamically constructed in the managing computer in advance, the managing computer constructs a first logical path between the first transmission node and the second transmission node, the first logical path is different from the default path specified in the first step as the first logical path; and a fourth step that the managing computer sets up to the first communication node and the second transmission node connected to the second communication node to be mapped to the first logical path and a second logical path to identify the communication route from the first communication node to the second communication node.

13. The logical path construction method according to claim 12, wherein the control information contains the class showing a priority of the session that is established, wherein the managing computer stores an allowable amount of delay caused by the transmission network of each class indicating the priority of the session, and stores link management information in which the available bandwidth of a link between two arbitrary adjacent transmission nodes forming the transmission network and an allowable amount of delay caused by the link are registered, and wherein the third step includes:

a fifth step in which the managing computer selects a route comprised of a link having an available bandwidth more than or equal to the guaranteed bandwidth contained in the control information by referring to the link management information, and calculates a total delay amount of the link forming the selected route;

a sixth step of specifying a route such that the total delay amount calculated by the fifth step becomes less than or equal to the allowable amount of a delay of a class contained in the control information; and a seventh step of when there are a plurality of routes specified by the sixth step, dynamically constructing the logical path whose average value of the available bandwidth of the link forming the route becomes a maximum as the first logical path.

14. The logical path construction method according to claim 13, wherein in a third step performed when receiving control information containing a class indicating that the session being established is of a priority moere eater than or equal to a predetermined priority and then when the available bandwidth of the default path specified in the first step is smaller than the guaranteed bandwidth contained in the control information, the managing computer suspends a processing for a predetermined time, wherein the method includes:

an eighth step in which when the managing computer newly receives the control information within the predetermined time, the managing computer excludes a default path corresponding to the control information that triggers the suspension of the processing and a logical path containing a link forming a route that the default path uses from candidates of a first logical path to the newly received control information;

a ninth step in which when the available bandwidth of the default path specified in the first step becomes more than or equal to the guaranteed bandwidth contained in the control information within the predetermined time in the third step in which the processing is suspended, the managing computer sets up a transmission node that forms the default path specified in the first step so that the default path specified in the first step may be mapped to the second logical path; and a tenth step in which when the available bandwidth of the specified default path does not become more than or equal to the guaranteed bandwidth contained in the control information, the managing computer cancels the suspension and transmits a command to transmit error information indicating an error to the communication node that transmitted the control information to the transmission node having transmitted the control information.

* * * * *